(12) United States Patent
Saika

(10) Patent No.: US 8,447,939 B2
(45) Date of Patent: May 21, 2013

(54) STORAGE CONTROL DEVICE AND METHOD FOR MANAGING SNAPSHOT

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 1375 days.

(21) Appl. No.: 12/059,298

(22) Filed: Mar. 31, 2008

(65) Prior Publication Data

US 2009/0198929 A1 Aug. 6, 2009

(30) Foreign Application Priority Data

Feb. 6, 2008 (JP) .................................. 2008-025932

(51) Int. Cl.
*G06F 12/00* (2006.01)

(52) U.S. Cl.
USPC .................... 711/162; 711/112; 711/E12.001

(58) Field of Classification Search
None
See application file for complete search history.

(56) References Cited

U.S. PATENT DOCUMENTS

| | | | | |
|---|---|---|---|---|
| 7,512,756 B2 * | 3/2009 | Malkin | | 711/162 |
| 2006/0218364 A1 | 9/2006 | Kitamura | | |
| 2007/0180239 A1 * | 8/2007 | Fujibayashi et al. | | 713/165 |

FOREIGN PATENT DOCUMENTS

| | | |
|---|---|---|
| JP | 2000011101 | 1/2000 |
| JP | 2004-342050 | 12/2004 |
| JP | 2006163903 | 6/2006 |
| JP | 2006268830 | 10/2006 |
| JP | 2006350423 | 12/2006 |

* cited by examiner

*Primary Examiner* — Edward Dudek, Jr.
*Assistant Examiner* — Ryan Dare
(74) *Attorney, Agent, or Firm* — Brundidge & Stanger, P.C.

(57) ABSTRACT

An erasure declaration-related write request is received. In cases where, in response to the erasure declaration-related write request, erasure-corresponding data elements which are data elements corresponding to an erasure target and which are stored in a storage area A in the first logical volume are overwritten with erasure data elements which are data elements signifying erasure at or after the snapshot acquisition time point, the storage area A is associated with a storage area B in which encrypted data elements corresponding to the erasure-corresponding data elements stored in storage area A are stored.

13 Claims, 19 Drawing Sheets

FIG. 6A

P-Vol

| BLOCK ADDRESS 0 | 0 |
| --- | --- |
| BLOCK ADDRESS 1 | 0 |
| BLOCK ADDRESS 2 | I |
| BLOCK ADDRESS 3 | D |
| BLOCK ADDRESS 4 | E |
| BLOCK ADDRESS 5 | F |
| BLOCK ADDRESS 6 | G |
| BLOCK ADDRESS 7 | H |

D-Vol

| | | PROTECTION BIT |
| --- | --- | --- |
| BLOCK ADDRESS 0 | * | 0 |
| BLOCK ADDRESS 1 | * | 0 |
| BLOCK ADDRESS 2 | C | 1 |
| BLOCK ADDRESS 3 | | 1 |
| BLOCK ADDRESS 4 | | 1 |
| BLOCK ADDRESS 5 | | 1 |
| ... | ... | ... |

SNAPSHOT MANAGEMENT TABLE

| | | SNAPSHOT NAME | | |
| --- | --- | --- | --- | --- |
| BLOCK ADDRESS | COW | V-VOL1 | V-VOL2 | V-VOL3 |
| 0 | 000 | DVOL-0 | NONE | NONE |
| 1 | 000 | DVOL-1 | NONE | NONE |
| 2 | 000 | DVOL-2 | NONE | NONE |
| 3 | 100 | NONE | NONE | NONE |
| 4 | 100 | NONE | NONE | NONE |
| 5 | 100 | NONE | NONE | NONE |
| 6 | 100 | NONE | NONE | NONE |
| 7 | 100 | NONE | NONE | NONE |

FIG. 6B

P-Vol

| BLOCK ADDRESS 0 | 0 |
| --- | --- |
| BLOCK ADDRESS 1 | 0 |
| BLOCK ADDRESS 2 | I |
| BLOCK ADDRESS 3 | D |
| BLOCK ADDRESS 4 | E |
| BLOCK ADDRESS 5 | F |
| BLOCK ADDRESS 6 | G |
| BLOCK ADDRESS 7 | H |

D-Vol

| | | PROTECTION BIT |
| --- | --- | --- |
| BLOCK ADDRESS 0 | * | 0 |
| BLOCK ADDRESS 1 | * | 0 |
| BLOCK ADDRESS 2 | C | 1 |
| BLOCK ADDRESS 3 | | 1 |
| BLOCK ADDRESS 4 | | 1 |
| BLOCK ADDRESS 5 | | 1 |
| ... | ... | ... |

SNAPSHOT MANAGEMENT TABLE

| | | SNAPSHOT NAME | | |
| --- | --- | --- | --- | --- |
| BLOCK ADDRESS | COW | V-VOL1 | V-VOL2 | V-VOL3 |
| 0 | 010 | DVOL-0 | NONE | NONE |
| 1 | 010 | DVOL-1 | NONE | NONE |
| 2 | 010 | DVOL-2 | NONE | NONE |
| 3 | 110 | NONE | NONE | NONE |
| 4 | 110 | NONE | NONE | NONE |
| 5 | 110 | NONE | NONE | NONE |
| 6 | 110 | NONE | NONE | NONE |
| 7 | 110 | NONE | NONE | NONE |

FIG. 7A

P-Vol

| | |
|---|---|
| BLOCK ADDRESS 0 | 0 |
| BLOCK ADDRESS 1 | 0 |
| BLOCK ADDRESS 2 | 1 |
| BLOCK ADDRESS 3 | D |
| BLOCK ADDRESS 4 | 0 |
| BLOCK ADDRESS 5 | 0 |
| BLOCK ADDRESS 6 | G |
| BLOCK ADDRESS 7 | H |

D-Vol

| | | PROTECTION BIT |
|---|---|---|
| BLOCK ADDRESS 0 | * | 0 |
| BLOCK ADDRESS 1 | * | 0 |
| BLOCK ADDRESS 2 | C | 1 |
| BLOCK ADDRESS 3 | E | 0 |
| BLOCK ADDRESS 4 | F | 0 |
| BLOCK ADDRESS 5 | | 1 |
| ... | ... | ... |

SNAPSHOT MANAGEMENT TABLE

| BLOCK ADDRESS | COW | V-VOL1 | V-VOL2 | V-VOL3 |
|---|---|---|---|---|
| 0 | 010 | DVOL-0 | NONE | NONE |
| 1 | 010 | DVOL-1 | NONE | NONE |
| 2 | 010 | DVOL-2 | NONE | NONE |
| 3 | 110 | NONE | NONE | NONE |
| 4 | 000 | DVOL-3 | DVOL-3 | NONE |
| 5 | 000 | DVOL-4 | DVOL-4 | NONE |
| 6 | 110 | NONE | NONE | NONE |
| 7 | 110 | NONE | NONE | NONE |

FIG. 7B

P-Vol

| | |
|---|---|
| BLOCK ADDRESS 0 | 0 |
| BLOCK ADDRESS 1 | 0 |
| BLOCK ADDRESS 2 | 1 |
| BLOCK ADDRESS 3 | D |
| BLOCK ADDRESS 4 | 0 |
| BLOCK ADDRESS 5 | 0 |
| BLOCK ADDRESS 6 | G |
| BLOCK ADDRESS 7 | H |

D-Vol

| | | PROTECTION BIT |
|---|---|---|
| BLOCK ADDRESS 0 | * | 0 |
| BLOCK ADDRESS 1 | * | 0 |
| BLOCK ADDRESS 2 | C | 1 |
| BLOCK ADDRESS 3 | *| | 0 |
| BLOCK ADDRESS 4 | *| | 0 |
| BLOCK ADDRESS 5 | | 1 |
| ... | ... | ... |

SNAPSHOT MANAGEMENT TABLE

| BLOCK ADDRESS | COW | V-VOL1 | V-VOL2 | V-VOL3 |
|---|---|---|---|---|
| 0 | 010 | DVOL-0 | NONE | NONE |
| 1 | 010 | DVOL-1 | NONE | NONE |
| 2 | 010 | DVOL-2 | NONE | NONE |
| 3 | 110 | NONE | NONE | NONE |
| 4 | 000 | DVOL-3 | DVOL-3 | NONE |
| 5 | 000 | DVOL-4 | DVOL-4 | NONE |
| 6 | 110 | NONE | NONE | NONE |
| 7 | 110 | NONE | NONE | NONE |

FIG. 9A

P-Vol

| | |
|---|---|
| BLOCK ADDRESS 0 | 0 |
| BLOCK ADDRESS 1 | 0 |
| BLOCK ADDRESS 2 | C |
| BLOCK ADDRESS 3 | D |
| BLOCK ADDRESS 4 | E |
| BLOCK ADDRESS 5 | F |
| BLOCK ADDRESS 6 | G |
| BLOCK ADDRESS 7 | H |

D-Vol

| | | PROTECTION BIT |
|---|---|---|
| BLOCK ADDRESS 0 | - | 0 |
| BLOCK ADDRESS 1 | - | 0 |
| BLOCK ADDRESS 2 | | 1 |
| BLOCK ADDRESS 3 | | 1 |
| BLOCK ADDRESS 4 | | 1 |
| BLOCK ADDRESS 5 | | 1 |
| ... | | |

SNAPSHOT MANAGEMENT TABLE

| BLOCK ADDRESS | COW | V-VOL1 | V-VOL2 | V-VOL3 |
|---|---|---|---|---|
| 0 | 000 | DVOL-0 | NONE | V-VOL3 |
| 1 | 000 | DVOL-1 | NONE | NONE |
| 2 | 100 | NONE | NONE | NONE |
| 3 | 100 | NONE | NONE | NONE |
| 4 | 100 | NONE | NONE | NONE |
| 5 | 100 | NONE | NONE | NONE |
| 6 | 100 | NONE | NONE | NONE |
| 7 | 100 | NONE | NONE | NONE |

FIG. 9B

P-Vol

| | |
|---|---|
| BLOCK ADDRESS 0 | 0 |
| BLOCK ADDRESS 1 | 0 |
| BLOCK ADDRESS 2 | C |
| BLOCK ADDRESS 3 | D |
| BLOCK ADDRESS 4 | E |
| BLOCK ADDRESS 5 | F |
| BLOCK ADDRESS 6 | G |
| BLOCK ADDRESS 7 | H |

D-Vol

| | | PROTECTION BIT |
|---|---|---|
| BLOCK ADDRESS 0 | | 1 |
| BLOCK ADDRESS 1 | | 1 |
| BLOCK ADDRESS 2 | | 1 |
| BLOCK ADDRESS 3 | | 1 |
| BLOCK ADDRESS 4 | | 1 |
| BLOCK ADDRESS 5 | | 1 |
| ... | | |
| DUMMY ADDRESS FF | - | 0 |

SNAPSHOT MANAGEMENT TABLE

| BLOCK ADDRESS | COW | V-VOL1 | V-VOL2 | V-VOL3 |
|---|---|---|---|---|
| 0 | 000 | DVOL-FF | NONE | V-VOL3 |
| 1 | 000 | DVOL-FF | NONE | NONE |
| 2 | 100 | NONE | NONE | NONE |
| 3 | 100 | NONE | NONE | NONE |
| 4 | 100 | NONE | NONE | NONE |
| 5 | 100 | NONE | NONE | NONE |
| 6 | 100 | NONE | NONE | NONE |
| 7 | 100 | NONE | NONE | NONE |

| V-VOL1 | IRREVERSIBLE |
| --- | --- |
| V-VOL2 | REVERSIBLE |
| V-VOL3 | REVERSIBLE |

FIG. 15A

P-Vol

| | |
|---|---|
| BLOCK ADDRESS 0 | 0 |
| BLOCK ADDRESS 1 | 0 |
| BLOCK ADDRESS 2 | 1 |
| BLOCK ADDRESS 3 | D |
| BLOCK ADDRESS 4 | 0 |
| BLOCK ADDRESS 5 | 0 |
| BLOCK ADDRESS 6 | G |
| BLOCK ADDRESS 7 | H |

D-Vol

| | | PROTECTION BIT |
|---|---|---|
| BLOCK ADDRESS 0 | *1 | 0 |
| BLOCK ADDRESS 1 | *1 | 0 |
| BLOCK ADDRESS 2 | C | 1 |
| BLOCK ADDRESS 3 | *1 | 0 |
| BLOCK ADDRESS 4 | *1 | 0 |
| BLOCK ADDRESS 5 | | |

SNAPSHOT MANAGEMENT TABLE

| BLOCK ADDRESS | COW | V-VOL1 | V-VOL2 | V-VOL3 |
|---|---|---|---|---|
| 0 | 010 | DVOL-0 | NONE | NONE |
| 1 | 010 | DVOL-1 | NONE | NONE |
| 2 | 010 | DVOL-2 | NONE | NONE |
| 3 | 110 | NONE | NONE | NONE |
| 4 | 000 | DVOL-3 | DVOL-3 | NONE |
| 5 | 000 | DVOL-4 | DVOL-4 | NONE |
| 6 | 110 | NONE | NONE | NONE |
| 7 | 110 | NONE | NONE | NONE |

FIG. 15B

P-Vol

| | |
|---|---|
| BLOCK ADDRESS 0 | 0 |
| BLOCK ADDRESS 1 | 0 |
| BLOCK ADDRESS 2 | 1 |
| BLOCK ADDRESS 3 | D |
| BLOCK ADDRESS 4 | 0 |
| BLOCK ADDRESS 5 | 0 |
| BLOCK ADDRESS 6 | G |
| BLOCK ADDRESS 7 | H |

D-Vol

| | | PROTECTION BIT |
|---|---|---|
| BLOCK ADDRESS 0 | *1 | 0 |
| BLOCK ADDRESS 1 | *1 | 0 |
| BLOCK ADDRESS 2 | C | 1 |
| BLOCK ADDRESS 3 | *1 | 0 |
| BLOCK ADDRESS 4 | *1 | 0 |
| BLOCK ADDRESS 5 | | |

SNAPSHOT MANAGEMENT TABLE

| BLOCK ADDRESS | COW | V-VOL1 | V-VOL2 | V-VOL3 |
|---|---|---|---|---|
| 0 | 010 | *** | NONE | NONE |
| 1 | 010 | *** | NONE | NONE |
| 2 | 010 | *** | NONE | NONE |
| 3 | 110 | NONE | NONE | NONE |
| 4 | 000 | *** | DVOL-3 | NONE |
| 5 | 000 | *** | DVOL-4 | NONE |
| 6 | 110 | NONE | NONE | NONE |
| 7 | 110 | NONE | NONE | NONE |

FIG. 16

SNAPSHOT MANAGEMENT TABLE

| BLOCK ADDRESS | COW | SNAPSHOT NAME | | | ENCRYPTION |
| --- | --- | --- | --- | --- | --- |
| | | V-VOL1 | V-VOL2 | V-VOL3 | |
| 0 | 000 | NONE | NONE | NONE | 000 |
| 1 | 000 | NONE | NONE | NONE | 000 |
| 2 | 000 | NONE | NONE | NONE | 000 |
| 3 | 000 | NONE | NONE | NONE | 000 |
| 4 | 000 | NONE | NONE | NONE | 000 |
| 5 | 000 | NONE | NONE | NONE | 000 |
| 6 | 000 | NONE | NONE | NONE | 000 |
| 7 | 000 | NONE | NONE | NONE | 000 |
| ENCRYPTION REQUIRED? | | No | No | No | |
| CREATION DATE AND TIME | | YYMMHHMM | YYMMHHMM | YYMMHHMM | |

STORAGE CONTROL DEVICE AND METHOD FOR MANAGING SNAPSHOT

CROSS-REFERENCE TO PRIOR APPLICATION

This application relates to and claims the benefit of priority from Japanese Patent Application number 2008-25932, filed on Feb. 6, 2008 the entire disclosure of which is incorporated herein by reference.

BACKGROUND

The present invention generally relates to the management of snapshots.

Technology for managing snapshots is known. Such technology is handled by a file server, and more specifically, by network storage such as a NAS (Network Attached Storage) device, for example. In cases where the technology is handled by a NAS device, the latest state of the file system is maintained by way of file updates or the like while holding static images of the file system at certain time points. Snapshots make it possible to acquire a plurality of generation backups and are disclosed in Japanese Application Laid Open No. 2004-342050, for example.

In the management of the snapshots of a first logical volume, for example, in cases where data elements corresponding to a write target are written to a first logical volume at or after the snapshot acquisition time points, data elements prior to the update resulting from the writing of these data elements are saved to a second logical volume.

In this snapshot management, by overwriting erasure-corresponding data elements which are data elements corresponding to an erasure target and which are stored in the first logical volume at or following the snapshot acquisition time point, for example, with erasure data elements which are data elements signifying erasure (data elements represented by "0", for example), even in cases where the erasure target is erased from the first logical volume, the erasure-corresponding data elements are saved to the second logical volume. Hence, the erasure-corresponding data elements remain in the second logical volume, and consequently, there is a risk that the corresponding erasure data will be leaked. This is more of a problem in cases where the erasure target is highly confidential information such as personal information.

SUMMARY

Therefore, an object of the present invention is to eliminate the risk of leakage of erasure-corresponding data elements which have been saved from a first logical volume to a second logical volume.

Further objects of the present invention will become clear from the subsequent description.

An erasure declaration-related write request is received. In response to the erasure declaration-related write request, in cases where erasure-corresponding data elements which are data elements corresponding to an erasure target and which are stored in a storage area A in the first logical volume are overwritten with erasure data elements which are data elements signifying erasure at or after the snapshot acquisition time point, the storage area A is associated with a storage area B in which encrypted data elements corresponding to the erasure-corresponding data elements stored in storage area A are stored.

BRIEF DESCRIPTION OF THE DRAWINGS

FIG. 6A shows a P-Vol, a D-Vol and a snapshot management table in a case where the write processing program receives a normal write command to write block data "I" to P-Vol block #2 following the first snapshot acquisition time point;

FIG. 6B shows a P-Vol, a D-Vol and a snapshot management table at the second snapshot acquisition time point;

FIG. 7A shows a P-Vol, a D-Vol and a snapshot management table in cases where the write processing program receives an erase write command to write erase block data "0" to P-Vol blocks #4 and #5 following the second snapshot acquisition time point;

FIG. 7B shows the fact that encrypted block data "*" is stored in the saving destination D-Vol blocks #4 and #5 corresponding to protection bit "0";

FIG. 9A shows a first specific example of snapshot management in an irreversible protection case;

FIG. 9B shows a second specific example of snapshot management in an irreversible protection case;

FIG. 15A shows a P-Vol, a D-Vol and a snapshot management table at a certain time point according to a second embodiment of the present invention;

FIG. 15B shows the fact that the D-Vol block address which is associated with V-VOL1 in the snapshot management table is encrypted;

FIG. 16 shows a constitutional example of a snapshot management table of the second embodiment of the present invention;

DETAILED DESCRIPTION OF THE PREFERRED EMBODIMENTS

Figure 1:
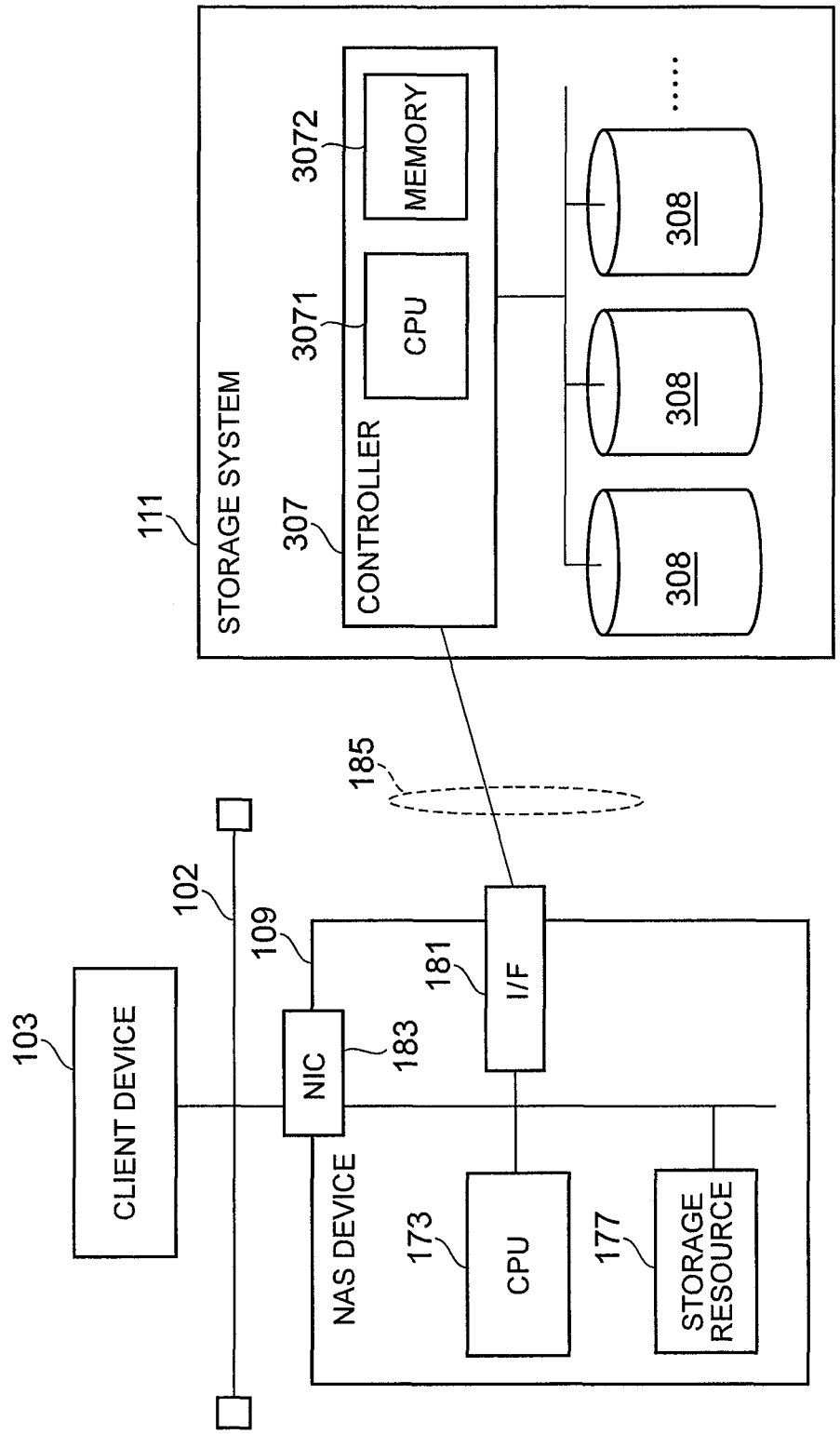
FIG. 1 shows a constitutional example of a computer system according to a first embodiment of the present invention.

In Embodiment 1, a storage control device which provides a higher level device (e.g. client computer, another storage control system and so on) with a first logical volume among first and second logical volumes of a storage device and manages a snapshot of the first logical volume comprises a write processing module and a read processing module. In cases where data elements corresponding to a write target are written to a first storage area in the first logical volume at or after a snapshot acquisition time point, the write processing module saves pre-update data elements which are stored in the first storage area in the second logical volume, and writes data elements corresponding to the write target to the first storage area. In cases where data elements are read from a second storage area of the snapshot of the first logical volume, the read processing module reads data elements from the storage area in the second logical volume if a storage area in the second logical volume is associated with the second storage area and reads data elements from the storage area in the first logical volume corresponding to the second storage area if a storage area in the second logical volume is not associated with the second storage area. In cases where the write processing module receives a write request corresponding to erasure, and in response to the write request corresponding to erasure, overwrites erasure-corresponding data elements which are data elements corresponding to an erasure target and which are stored in a third storage area in the first logical volume with erasure data elements which are data elements signifying erasure at or after the snapshot acquisition time point, the write processing module associates the third storage area with a fourth storage area in which encrypted data elements corresponding to the erasure-corresponding data elements stored in the third storage area are stored.

Embodiment 2 is the storage control device according to Embodiment 1, wherein the read processing module receives a first read request, and in cases where, in response to the first read request, the read processing module reads data elements from a fifth storage area of the snapshot of the first logical volume, if the fifth storage area corresponds to the fourth storage area, the read processing module executes any of the following (1) to (3):

(1) transmitting the encrypted data elements stored in the fourth storage area to a transmission source of the first read request;

(2) transmitting the erasure-corresponding data elements obtained by decoding the encrypted data elements to the transmission source of the first read request; and (3) transmitting an access error to the transmission source of the first read request.

Here, the transmission source of the first read request may be a higher level device or may be a separate processing module which exists on a level above the read processing module in this storage control device.

Embodiment 3 is the storage control device according to Embodiment 1 or 2, wherein the fourth storage area is a storage area in the second logical volume. Whether protection is required or not is set for each storage area of the second logical volume. The write processing module sets such that protection is required for the fourth storage area which constitutes a write destination of the encrypted data elements of the corresponding erasure data stored in the third storage area.

The encrypted data elements stored in the fourth storage area are data elements which are obtained by encrypting the erasure-corresponding data elements stored in the third storage area using a reversible conversion format.

Embodiment 4 is the storage control device according to Embodiment 3, wherein the read processing module executes the following (1) and (2):

(1) in cases where data elements are read from the fifth storage area of the snapshot of the first logical volume in response to the first read request, if detecting that a setting is made such that protection is required for the fourth storage area, and if decoding is permitted, reading the encrypted data elements from the fourth storage area and decoding same, and transmitting the erasure-corresponding data elements obtained by the processing to the transmission source of the first read request; and (2) in cases where a second read request is received and data elements are read from a sixth storage area of the snapshot of the first logical volume in response to the second read request, if detecting that a setting is made such that protection is not required for a seventh storage area in the second logical volume corresponding to the sixth storage area, reading data elements from the seventh storage area and transmitting the data elements to the transmission source of the second read request without decoding the data elements.

Embodiment 5 is the storage control device according to Embodiment 1 or 2, wherein the encrypted data elements are specified data elements different from the erasure-corresponding data elements and are data elements which cannot be decoded to produce the erasure-corresponding data elements.

Embodiment 6 is the storage control device according to Embodiment 5, wherein the fourth storage area is a predetermined storage area in which the specified data elements are stored in advance and is a storage area common to a plurality of storage areas in the first logical volume in which a plurality of the corresponding erasure data are stored. The write processing module associates the fourth storage area with the storage area of the write destination of the erasure data elements irrespective of which storage area in the first logical volume the erasure data elements are written to.

Embodiment 7 is the storage control device according to any of Embodiments 1 to 6, wherein the storage control device comprises an address encryption module. If, among a plurality of storage areas which constitute the snapshot of the first logical volume, the number of storage areas associated with the storage area in which encrypted data elements are stored is greater than a first number, the address encryption module encrypts the respective storage area addresses in snapshot management information that comprises the respective storage area addresses associated with the addresses of the respective storage areas constituting the snapshot of the first logical volume. According to Embodiment 7, because the storage area address is encrypted using a reversible conversion format, the encrypted storage area address is decoded during read processing in response to a read request, for example, and data elements are read from the storage area specified by the storage area address obtained as a result of the decoding.

Embodiment 8 is the storage control device according to any of Embodiments 1 to 7, further comprising an encryption setting module. If, among a plurality of storage areas which constitute the snapshot of the first logical volume, the number of storage areas associated with the storage area in which encrypted data elements are stored is greater than a first number, the encryption setting module sets the snapshot as an encryption target. In cases where the write processing module detects that the snapshot has been set as the encryption target, the write processing module associates an encrypted address of a saving destination storage area in the second logical volume with the address of the storage area of the snapshot of the first logical volume corresponding to the first storage area in snapshot management information which comprises the storage area address which is associated with the address of the storage area constituting the snapshot of the first logical volume.

Embodiment 9 is the storage control device according to Embodiment 7 or 8, wherein the snapshot management information comprises the address of the storage area in the second logical volume corresponding to the address of the storage area of the snapshot of the first logical volume for each generation of the snapshot of the first logical volume. The address which is associated with the address of the storage area of a snapshot of a generation for which the number of storage areas in which encrypted data elements are stored is greater than the first value is encrypted.

Embodiment 10 is the storage control device according to any of Embodiments 1 to 9, wherein the write processing module treats the encrypted data elements of the erasure-corresponding data elements as either data elements which are obtained by using a reversible conversion format to encrypt the corresponding erasure data, or data elements in a format which does not permit decoding to produce the corresponding erasure data, depending on which snapshot acquisition time point the time point at which the erasure data elements are written follows.

Embodiment 11 is the storage control device according to any of Embodiments 1 to 10, wherein the write processing module and read processing module are contained in the snapshot management module which manages the snapshot of the first logical volume. A higher level processing module which converts a file unit I/O request received from the higher level device into a block unit I/O request and outputs the block unit I/O request to a lower level is provided in the storage control device on a level above the snapshot management module. The write target and the erasure target are files. The data elements are block data. The write processing module writes data elements corresponding to the write target file in response to a block unit write request. The read processing module reads data elements corresponding to a read target file and transmits the data elements thus read to the higher level processing module which is a transmission source of the block unit read request, in response to a block unit read request. When receiving an erasure request designating an erasure target file from the higher level device, the higher level processing module associates a write request to overwrite the erasure-corresponding data elements corresponding to the erasure target file with the erasure data elements, with an erasure declaration and sends the result to the snapshot management module. A write request corresponding to the erasure is the write request associated with the erasure declaration.

The storage control device is a file server, and more specifically, a NAS device, for example. Furthermore, the storage control device is implemented by a circuit board, for example, and may be built into the storage system as one interface with the client.

At least one of the write processing module, read processing module, address encryption module, encryption setting module, snapshot management module, and upper management module can be constructed by means of hardware, a computer program, or a combination thereof (where some of the modules are implemented by a computer program and the remainder are implemented by hardware, for example). The computer program is read to and executed by a predetermined processor. Additionally, a storage area which exists on the hardware resources such as memory may also be suitably used during the information processing in which the computer program is read to and executed by the processor. Further, the computer program may also be installed on a computer from a recording medium such as a CD-ROM or downloaded to the computer via a communication network. Furthermore, the storage device may be a physical storage device or a logical storage device. Possible physical storage devices include, for example, a hard disk, a magnetic disk, an optical disk, or a semiconductor memory. Suitable logical storage devices can include a logical volume.

A few embodiments of the present invention will be described in details hereinbelow with reference to the drawings. Here, respective storage areas which are the constituent elements of the logical volume are called 'blocks' and the data stored in a single block is known as 'block data'.

First Embodiment

FIG. 1 shows a constitutional example of a computer system according to the first embodiment of the present invention.

A plurality of client devices 103 (or one thereof) and a NAS device 109 are connected to a communication network (LAN (Local Area Network), for example) 102. A storage system 111 is connected via a communication network 185 such as a SAN (Storage Area Network) or a dedicated line to the NAS device 109. The storage resources (one or more logical volumes, for example) of the storage system 111 are mounted on the NAS device 109 as a file system.

The storage system 111 comprises a plurality of physical storage devices (hard disk drives or flash memory devices, for example) 308 and a controller 307 which controls access to the plurality of physical storage devices 308. A plurality of logical volumes (logical storage devices) are formed based on the storage space provided by the plurality of physical storage devices 308. The controller 307 is a device which comprises a CPU 3071 and a memory 3072 (a flash memory which temporarily stores the processing results of the CPU 3071, for example), and so forth. The controller 307 receives a block unit I/O request from the NAS device 109 (device driver of device 109, for example) and performs the writing of data corresponding to the I/O request to the logical volume corresponding to the I/O request or performs the reading of data therefrom.

The NAS device 109 comprises a CPU 173, a storage resource 177, an I/F (interface device) 181, and an NIC (Network Interface Card) 183. Communication with the storage system 111 is carried out via the I/F 181. Communication with the client devices 103 is carried out via the NIC 183. The storage resource 177 can be constituted by at least one of a memory and a disk device, for example, but is not limited to such a constitution. The storage resource 177 may also be constituted by another type of storage medium.

The storage resource 177 stores a plurality of computer programs and these computer programs are executed by the CPU 173. In cases where the computer programs are the subject of the description hereinbelow, processing is actually executed by the CPU which executes the computer programs.

Figure 2:
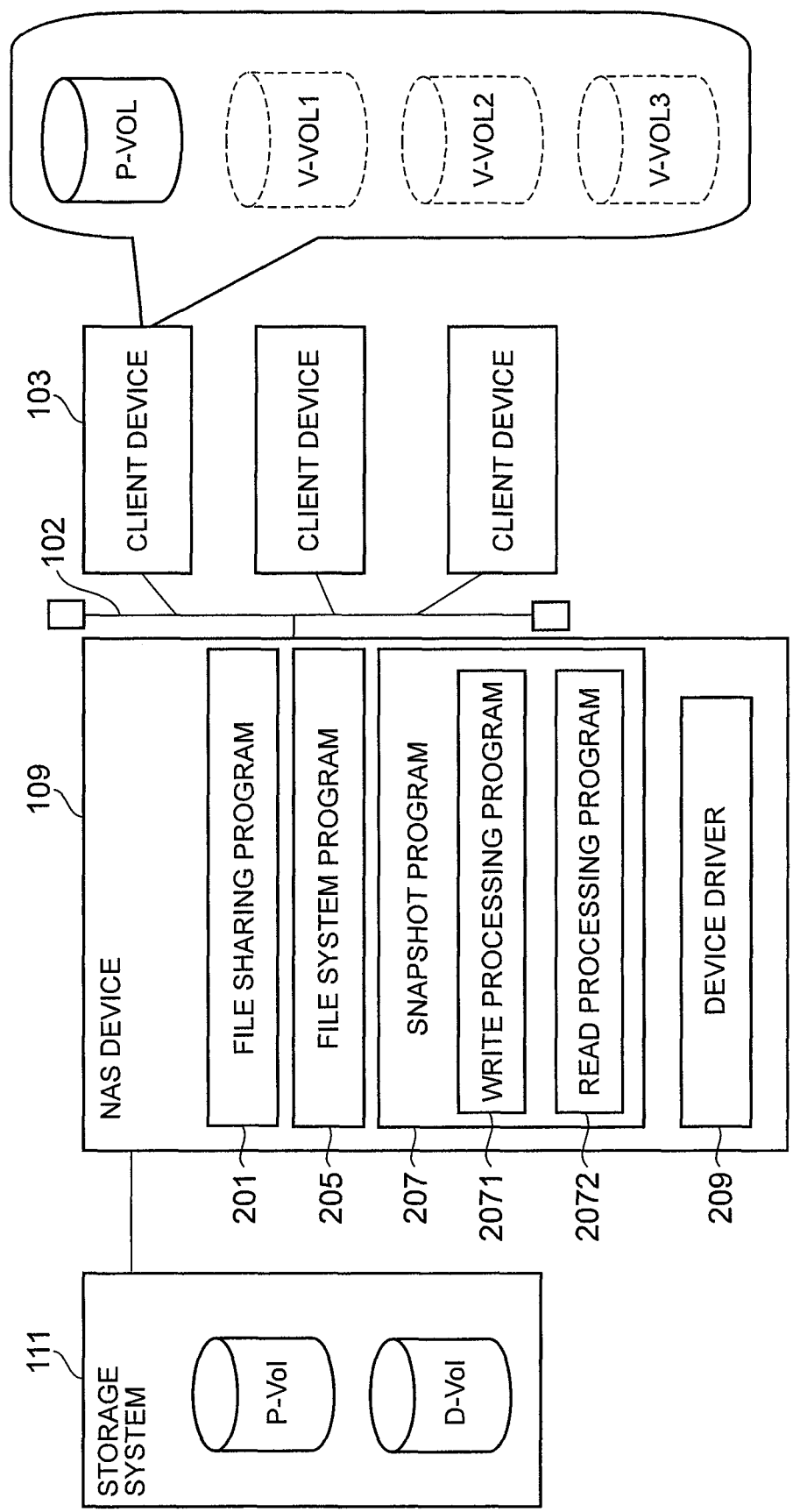
FIG. 2 shows computer programs that are executed by a NAS device, logical volumes of the storage system, and logical volumes which are provided in client devices.

FIG. 2 shows computer programs that are executed by NAS device 109, logical volumes of the storage system 111, and logical volumes which are provided in the client devices 103.

The logical volumes which exist in the storage system 111 include a primary volume (referred to as the 'P-Vol' hereinbelow) and an incremental volume (referred to as the 'D-Vol' hereinbelow). Of the P-Vol and D-Vol, the P-Vol is provided in the client devices 103 and the D-Vol is not provided in the client devices 103.

The P-Vol is a logical volume which is designated as the I/O destination by the client devices 103. Block data corresponding to the block unit write request which are transmitted by the NAS device 109 in response to a file unit write request from the client devices 103 are written to the P-Vol. Furthermore, block data corresponding to block unit read request which are transmitted by the NAS device 109 in response to the file unit read request from the client devices 103 are read from the P-Vol.

The D-Vol is a logical volume which constitutes the saving destination from the P-Vol of the block data before being overwritten by the block data (pre-update block data).

In addition to the P-Vol, the client devices 103 are provided with one or a plurality of virtual volumes (referred to as 'V-VOL' hereinbelow). The virtual volume is a P-Vol snapshot corresponding to a certain snapshot acquisition time point of the P-Vol. In the description of this embodiment, three snapshots V-VOL 1 to 3 corresponding to first to third snapshot acquisition time points can be created.

NAS device 109 executes a file sharing program 201, a file system program 205, a snapshot program 207, and a device driver 209.

For example, an OS layer (OS is an abbreviation for 'Operating System') is constituted by the file system program 205, snapshot program 207, and device driver 209. The file system program 205 is a program for controlling the mounted file system and is able to provide a mounted file system, that is, a hierarchized logical view (view representing a hierarchical structure such as a directory or file hierarchical structure, for example) in an upper layer. Furthermore, the file system program 205 is able to convert the logical data structure of the view (the files and paths to the files, for example) into a physical data structure (the block unit data and block unit addresses, for example) and execute I/O processing with the lower layers (requests block data I/O, for example). That is, the file system program 205 is able to convert a file unit I/O request from the file sharing program 201 into a block unit I/O request and transmit the block unit I/O request to the snapshot program 207. In addition, in cases where block data corresponding to the block unit read request are received from the snapshot program 207, the file system program 205 is able to provide the client devices 103 with a read target file which comprises the block data via the file sharing program 201. The block unit I/O request transmitted by the file system program 205 is input to the device driver 209 via the snapshot program 207. The device driver 209 is a program that executes the block unit I/O request thus input. The snapshot program 207 is capable of holding static images (that is, snapshots) at certain time points of the file system and restore these images.

The file sharing program 201 provides the client devices 103 connected to the communication network 102 with a file sharing protocol (NFS (Network File System) or CIFS (Common Internet File System), for example) and provides a file sharing function between a plurality of client devices 103. The file sharing program 201 receives file unit I/O requests from the client devices 103 and inputs file unit I/O requests for the file system program 205 to the snapshot program 207.

The snapshot program 207 comprises a write processing program 2071 and a read processing program 2072. The write processing program 2071 saves pre-update block data of the block data from the P-Vol to the D-Vol in cases where block data are written to the P-Vol at or after the snapshot acquisition time point in response to a block unit write request which is input by the file system program 205, and writes the block data to the P-Vol. In cases where block data are read from a certain storage area of V-VOL1 in response to a block unit read request which is input by the file system program 205, the read processing program 2072 reads block data from the storage area of either the P-Vol or D-Vol corresponding to the certain storage area and transmits the block data thus read to the file system program 205.

COW (Copy On Write) for the acquisition of a snapshot by the snapshot program 207 will be described hereinbelow.

Figure 3:
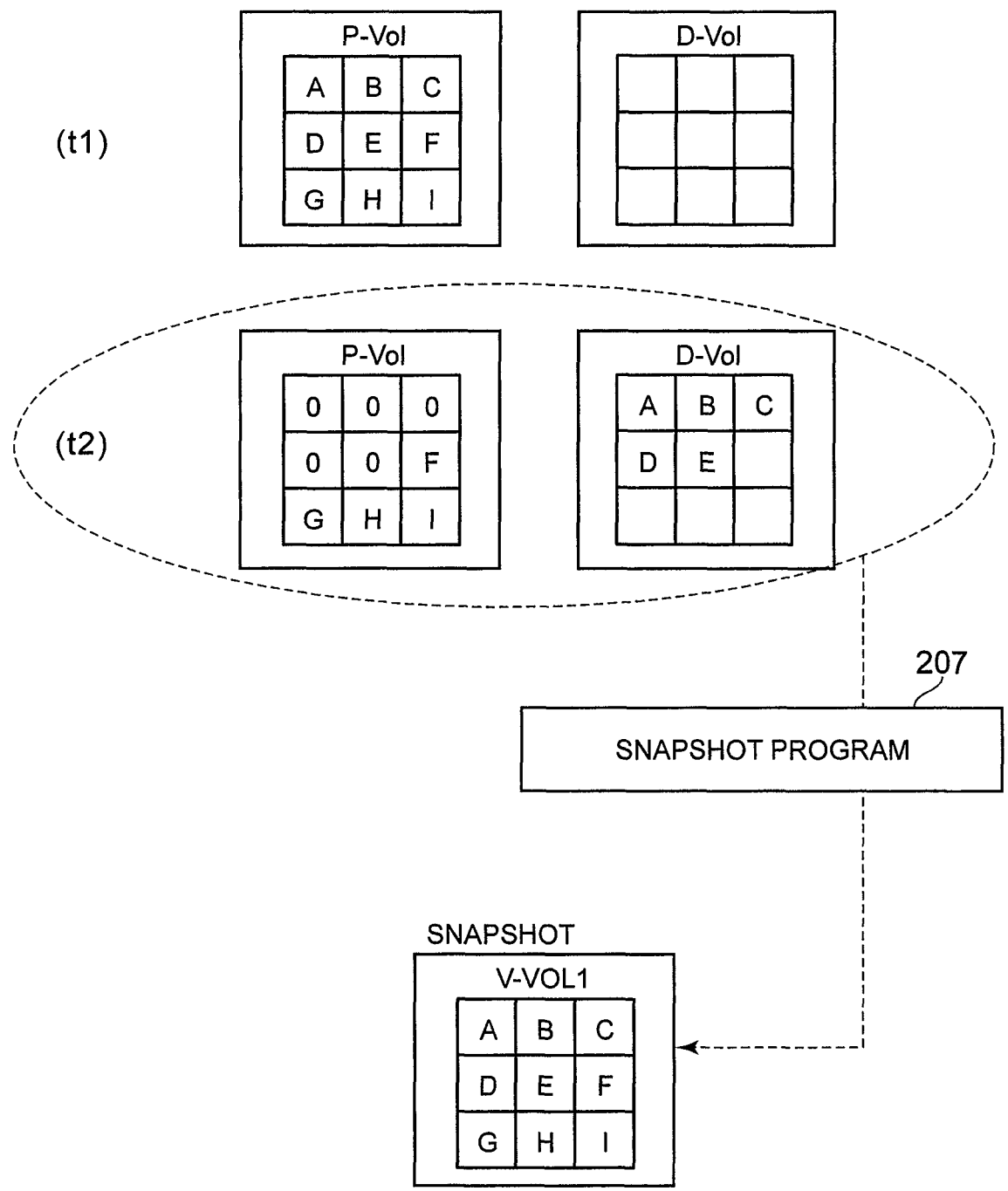
FIG. 3 shows an example of COW (Copy On Write) for acquiring snapshots.

FIG. 3 shows an example of COW for the purpose of snapshot acquisition.

The P-Vol has nine blocks #1 to #9, for example and block data "A" to "I" are stored in nine blocks #1 to #9 at time (t1) which is the snapshot acquisition time point.

In cases where block data "a" to "e" are newly written to blocks #1 to #5 at subsequent time (t2), the existing block data "A" to "E" in blocks #1 to #5 are saved to the D-Vol by a snapshot program 207. This operation is an operation which is generally known as COW (Copy On Write).

Following time (t2), the snapshot program 207 creates a V-Vol1 (snapshot) which is a P-Vol image that corresponds to time (t1) in cases where a snapshot restore (mount) of time (t1) is requested and makes the file system 205 visible to V-VOL1. The snapshot program 207 is able to access the P-Vol and D-Vol via the device driver 209 and create a virtual volume (virtual logical volume) which combines the P-Vol and D-Vol. According to the example in FIG. 3, block data "A" to "E" which are stored in blocks #1 to #5 of the D-Vol (the saving destination of block data A to E at time (t2)) exist in blocks #1 to #5 of the V-VOL1 and block data "F" to "I" (block data stored in blocks #6 to 9 of P-Vol) which have not been saved from the P-Vol at or after time (t1) exist in blocks #6 to #9 of V-VOL1.

The client devices 103 are able to access the V-VOL1 via the file sharing program 201 and file sharing program 205.

Further, the file system program 205 sometimes receives a file erasure request from the client devices 103 via the file sharing program 201. In this case, in this embodiment, the file system program 205 issues a write request to overwrite the respective corresponding erasure block data corresponding to the file designated by the erasure request (called the 'erasure target file' hereinbelow) with the respective erasure block data (block data representing "0", for example) to the snapshot program 207. If all of the corresponding erasure block data which constitute the erasure target file are overwritten with the erasure block data, the erasure target file is erased from the P-Vol by the file system program 205.

In the snapshot management that is performed by the COW, corresponding erasure block data (block data to be overwritten) are normally saved to the D-Vol as a result of the COW caused by the overwriting of the erasure block data with the corresponding erasure block data at or after the snapshot acquisition time point.

In this embodiment, a scheme for preventing the leakage of corresponding erasure block data saved to the D-Vol is carried out. More specifically, the file system program 205 declares the fact that the request is a write request for erasure to the snapshot program 207 when a block unit write request is sent to the snapshot program 207 in accordance with the erasure request (transmits a code signifying erasure by including the code in the write request, for example). Further, in cases where a write request declaring erasure (a block unit write request) is received, the snapshot program 207 associates the address of the block in which the corresponding erasure block data are stored (the block in the P-Vol) and the address of the storage area in which the encrypted block data corresponding to the corresponding erasure block data are stored instead of saving the corresponding erasure block data as is in the D-Vol. For this reason, if the address of the read source block of the V-VOL (snapshot of P-Vol) is associated with the address of the storage area in which the encrypted block data are stored, the encrypted block data are read instead of the corresponding erasure block data. As a result, the leakage of the corresponding erasure block data can be prevented.

A summary of the processing performed by this embodiment will now be described with reference to FIGS. 4A to 8. In the following description, for the purpose of making the description easy to understand, the number of blocks constituting the P-Vol and the number of blocks constituting the D-Vol is taken to be eight in each case (six of the eight blocks are illustrated as D-Vol). Furthermore, the number of P-Vol snapshots is three (V-VOL 1 to 3) as mentioned earlier. In addition, the blocks constituting the P-Vol are called 'P-Vol blocks' and the blocks constituting the D-Vol are called 'D-Vol blocks' and the blocks constituting the V-VOL are referred to as 'V-VOL blocks'. Further, the blocks corresponding to the block address n of all of the P-Vol blocks, D-Vol blocks, and V-VOL blocks are known as 'block #n' (where n is an integer of 0 or more). Furthermore, the write commands associated with the erasure declaration are called 'erasure write commands' and, of the erasure write commands, normal write commands with which an erasure declaration is not associated are known as 'normal write commands'.

Figure 4A:
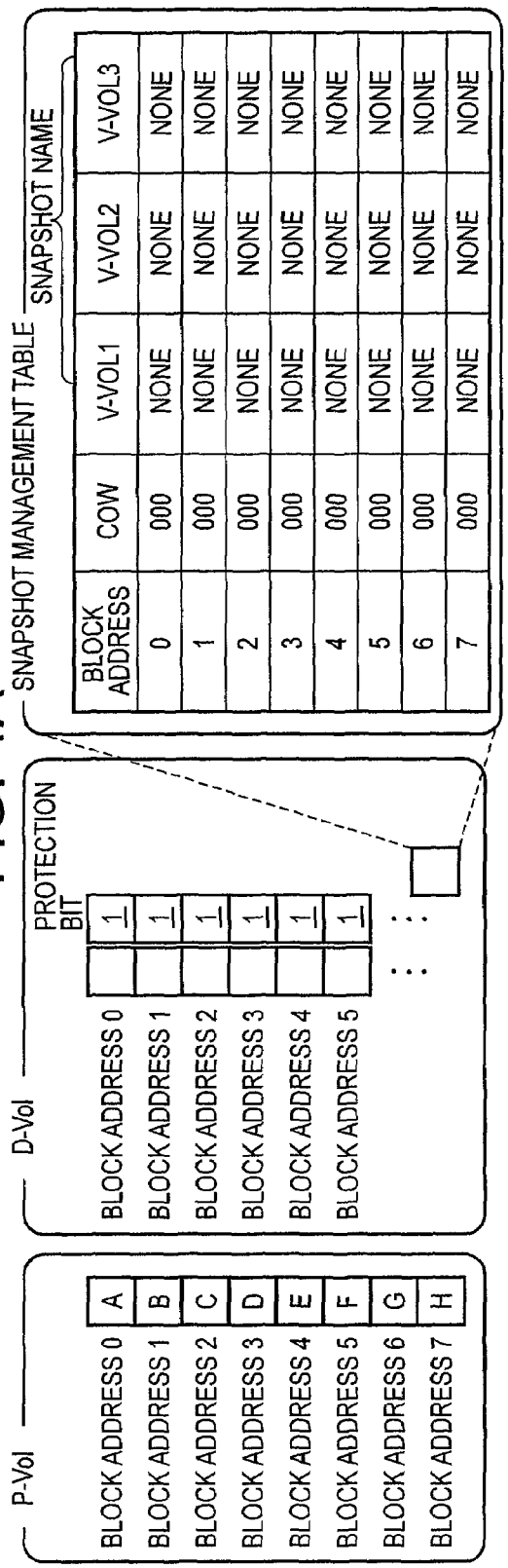
FIG. 4A shows a P-Vol, a D-Vol and a snapshot management table in an initial state prior to the first snapshot acquisition time point.

Suppose that the block data "A" to "H" are stored in eight P-Vol blocks which constitute the P-Vol as an initial state, as shown in FIG. 4A. Suppose also that block data are not stored in any of the eight D-Vol blocks of the D-Vol.

An area in which a protection bit is stored exists for each D-Vol block in the D-Vol. Here, the 'protection bit' is a bit for judging whether the D-Vol blocks corresponding to the protection bit are D-Vol blocks in which the block data to be protected are stored. In this embodiment, the protection bit is "1" in cases where protection is not required and "0" in cases where the block data are to be protected. In the initial state shown in FIG. 4A, all of the protection bits corresponding to all of the D-Vol blocks are "1".

A snapshot management table is prepared. The snapshot management table may also be stored in an optional storage resource such as storage resource 177 in the NAS device 109. However, in this embodiment, the snapshot management table is stored in a specified area within the D-Vol (an area other than the D-Vol blocks 1 to 8). The snapshot management table records which blocks of which logical volume of the P-VOL and D-Vol are to be accessed in cases where a particular V-VOL block of a particular V-VOL is the access destination. More specifically, the snapshot management table records, for each V-VOL, the address of each V-VOL block, a bit which represents whether a V-VOL block is a COW block (called the 'COW bit' hereinbelow), and the addresses of the blocks associated with the V-VOL blocks (called 'corresponding block' hereinbelow). More specifically, the snapshot management table is constituted by a block address column, a COW column, and three V-VOL columns. The block address column records the addresses of the respective V-VOL blocks of the V-VOL. In the COW column is a row of three COW bits corresponding to the V-VOL 1 to 3 for each V-VOL block address. Three V-VOL columns correspond to V-VOL 1 to 3. That is, one D-Vol can be used to manage a snapshot of a plurality of generations (three generations here).

Of the three consecutive COW bits, the leftmost COW bit corresponds to the V-VOL1, the center COW bit corresponds to V-VOL2, and the rightmost COW bit corresponds to V-VOL3. If the COW bit is "1", this signifies that COW has not yet been executed, and if the COW bit is "0", this signifies COW has been performed.

The V-VOL block column records the addresses of the blocks corresponding to the V-VOL blocks. As the addresses of the corresponding blocks, the addresses of the D-Vol blocks are recorded if the corresponding blocks are D-Vol blocks, and if the corresponding blocks are P-Vol blocks, a value signifying this fact ('none', for example) is recorded. If the address of the corresponding block is "none", the P-Vol blocks with the same addresses as the addresses of the V-VOL blocks are accessed. This is because all of the V-VOL 1 to 3 are P-Vol snapshots and the addresses of the V-VOL blocks therefore coincide with the P-Vol blocks. In an initial state, the addresses of the corresponding blocks are "none" for all of the V-VOL blocks irrespective of the V-VOL column considered. This is because the saving of block data by COW is not performed.

Figure 4B:
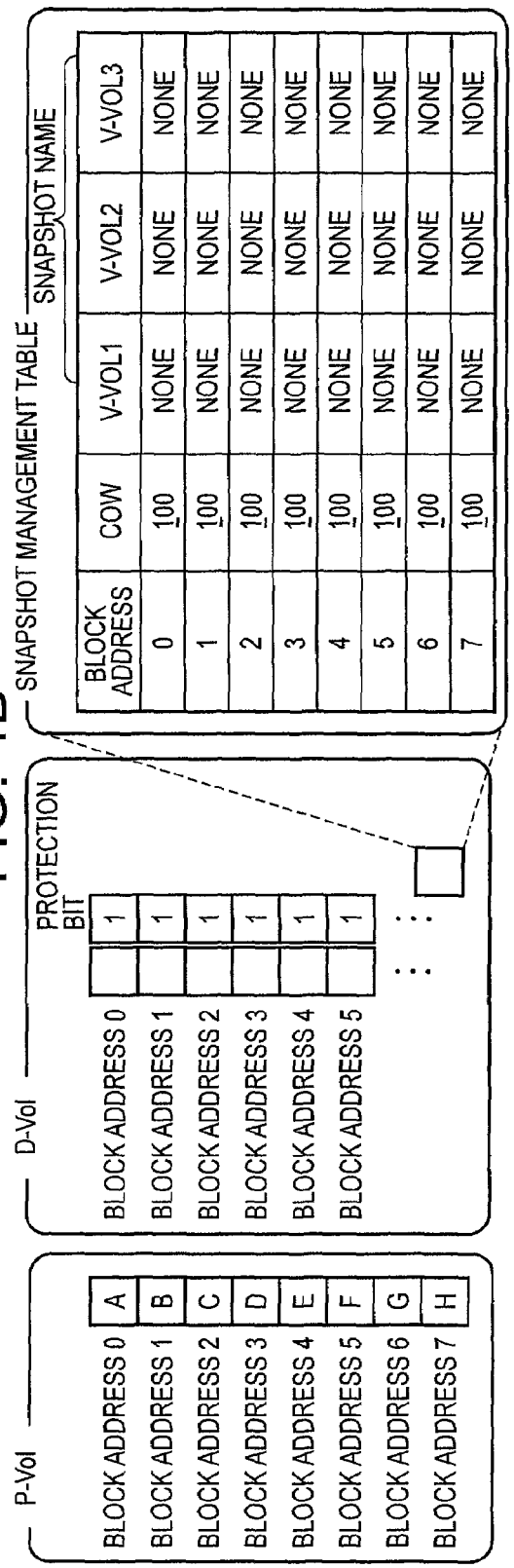
FIG. 4B shows a P-Vol, a D-Vol and a snapshot management table at a first snapshot acquisition time point.

In the initial state shown in FIG. 4A, the write processing program 2071 receives a first snapshot acquisition request. The time point at which the first snapshot acquisition request is received is the first snapshot acquisition time point. The write processing program 2071 updates all of the COW bits which constitute the leftmost COW bit string (COW bit string corresponding to V-VOL1) in the COW column of the snapshot management table to "1" in response to the first snapshot acquisition request, as shown in FIG. 4B.

Thereafter, the write processing program 2071 receives an erasure write command to write the erasure block data "0" in P-Vol blocks #0 and #1. In this case, as shown in FIG. 5A, the write processing program 2071 executes COW to save the corresponding erasure block data "A" and "B" which are stored in the P-Vol blocks #0 and #1 in the D-Vol blocks #0 and #1 in response to the erasure write command and writes the erasure block data "0" in the P-Vol blocks #0 and #1.

Figure 5A:
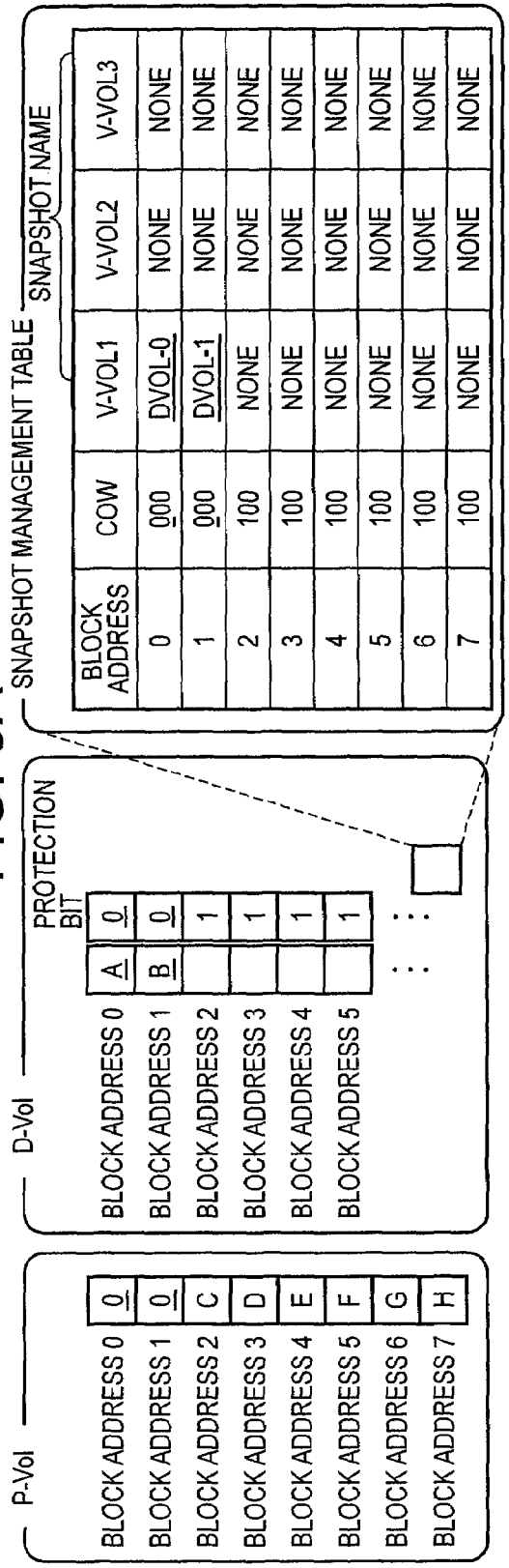
FIG. 5A shows a P-Vol, a D-Vol and a snapshot management table in a case where a write processing program receives an erase write command to write erase block data "0" to P-Vol blocks #0 and #1 following the first snapshot acquisition time point.

Furthermore, as shown in FIG. 5A, the write processing program 2071 updates the COW bits corresponding to the addresses 0 and 1 of the V-VOL blocks in the leftmost COW bit string from "1" to "0". It is accordingly clear that the V-VOL blocks #0 and #1 of the V-VOL1 have undergone COW. For the P-Vol blocks #0 and #1 corresponding to the V-VOL blocks #0 and #1 once same have undergone COW, COW is not performed because same is not required until the next snapshot acquisition time point.

Furthermore, as shown in FIG. 5A, the write processing program 2071 writes the addresses "DVOL-0" and "DVOL-1" of the D-VOL blocks #0 and #1 which are blocks corresponding to the V-VOL blocks #0 and #1 in cells corresponding to the V-VOL blocks #0 and #1 in the V-VOL column of the V-VOL1.

In addition, as shown in FIG. 5A, the write processing program 2071 updates each of the two protection bits corresponding to the D-Vol blocks #0 and #1 from "1" to "0". As a result, setting to the effect that the block data "A" and "B" stored in the D-Vol blocks #0 and #1 require protection is completed.

Figure 5B:
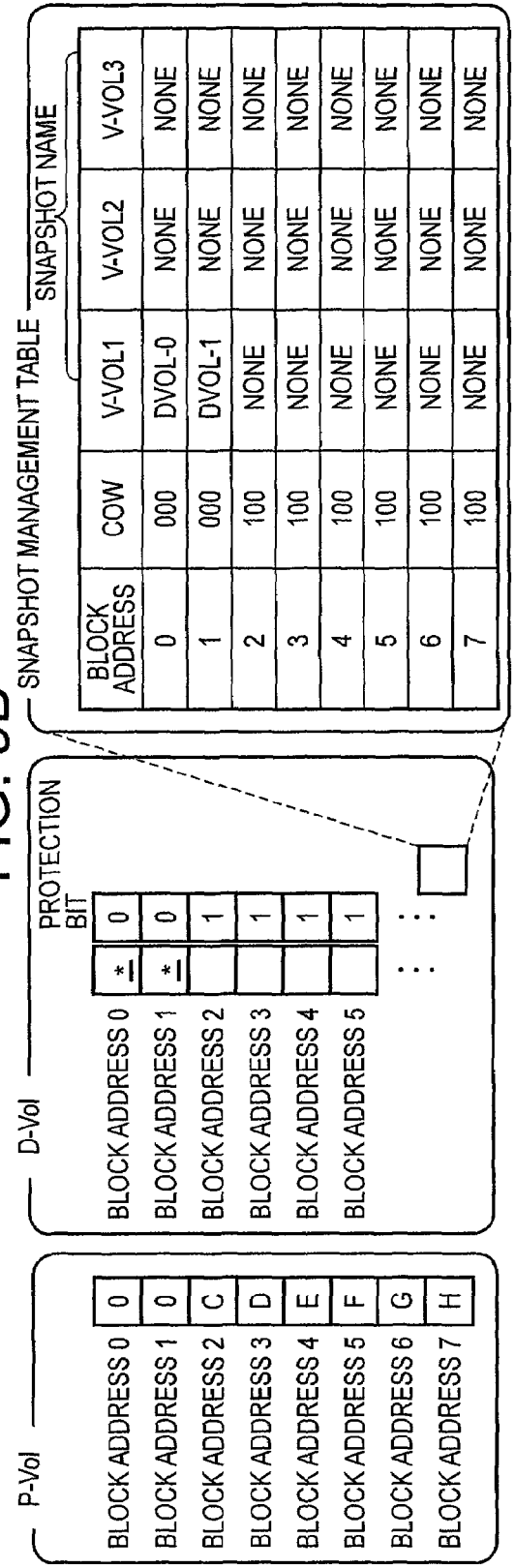
FIG. 5B shows the fact that encrypted block data "*" is stored in the saving destination D-Vol blocks #0 and #1 corresponding to protection bit "0"

Thereafter, as shown in FIG. 5B, the write processing program 2071 writes the encrypted block data "*" in place of the corresponding erasure block data "A" and "B" to the D-Vol blocks #0 and #1 corresponding to the protection bit "0". This is because the block data "A" and "B" which are stored in the D-Vol blocks #0 and #1 are block data that must essentially be erased and there is a need for protection so that the D-Vol blocks #0 and #1 are not easily referenced. The encrypted block data "*" may be data which can be decoded to produce the corresponding erasure block data (that is, data which are obtained by encrypting the corresponding erasure block data by means of a reversible conversion system) or may be data which cannot be decoded to produce the corresponding erasure block data. In either case, the corresponding erasure block data corresponding to the encrypted block data "*" cannot be specified from the encrypted block data "*"

Instead of saving the corresponding erasure block data "A" and "B" to the D-Vol blocks #0 and #1, processing to write the encrypted block data "*" to the D-Vol blocks #0 and #1 may also be executed.

Further, the write processing program 2071 receives a normal write command to write the block data "I" to P-Vol block #2. In this case, as shown in FIG. 6A, the write processing program 2071 saves the pre-update block data "C" stored in the P-Vol block #2 in the D-Vol block #2 and writes block data "I" to the P-Vol block #2 in response to the normal write command.

Furthermore, as shown in FIG. 6A, the write processing program 2071 updates the COW bit corresponding to address 2 of the V-VOL block in the leftmost COW bit string from "1" to "0".

Furthermore, as shown in FIG. 6A, the write processing program 2071 writes the address "DVOL-2" of the D-Vol block #2 which is the corresponding block of the V-VOL block #2 to the cell corresponding to the V-VOL block #2 in the V-VOL column of V-VOL1.

In addition, as shown in FIG. 6A, the write processing program 2071 does not update the protection bit corresponding to the D-Vol block #2 from "1" to "0" unlike cases where an erase write request is received.

Thereafter, the write processing program 2071 receives a second snapshot acquisition request. The time point at which the second snapshot acquisition request is received is the second snapshot acquisition time point, which is the snapshot acquisition time point which follows the first snapshot acquisition time point. As shown in FIG. 6B, the write processing program 2071 updates all of the COW bits which constitute the center COW bit string (the COW bit string corresponding to V-VOL2) in the COW column of the snapshot management table to "1" in response to the second snapshot acquisition request.

Thereafter, the write processing program 2071 then receives an erase write command to write erasure block data "0" to the P-Vol blocks #4 and #5. In this case, as shown in FIG. 7A, the write processing program 2071 saves the corresponding erasure block data "E" and "F" which are stored in P-Vol blocks #4 and #5 in the D-Vol blocks #3 and #4 in response to the erase write command and writes the erasure block data "0" to the P-Vol blocks #4 and #5.

Furthermore, as shown in FIG. 7A, the write processing program 2071 updates the COW bit corresponding to the addresses 4 and 5 of the V-VOL blocks in the leftmost COW bit string from "1" to "0".

In addition, as shown in FIG. 7A, the write processing program 2071 writes the addresses "DVOL-3" and "DVOL-4" of the D-Vol blocks #3 and #4 which are the corresponding blocks of the V-VOL blocks #4 and #5 to the cells corresponding to the V-VOL blocks #4 and #5 in the respective V-VOL columns of the V-VOL1 and V-VOL2.

In addition, as shown in FIG. 7A, the write processing program 2071 updates each of the two protection bits corresponding to the D-Vol blocks #4 and #5 from "1" to "0".

As shown in FIG. 7B, the write processing program 2071 then writes the encrypted block data "*" in place of the corresponding erasure block data "E" and "F" to the D-Vol blocks #4 and #5 corresponding to the protection bit "0".

Thereafter, in cases where a read request designating V-VOL1 is received, for example, the read processing program 2072 judges whether the read target block data is in the P-Vol or the D-Vol by referencing the COW bits in the snapshot management table corresponding to the block addresses contained in the read request. In cases where the COW bit is "1", the read processing program 2072 reads the block data from the P-Vol block corresponding to the designated block address, and in cases where the COW bit is "0", the read processing program 2072 reads the block data from the D-Vol block corresponding to D-Vol block address associated with the designated block address. When the protection bit corresponding to the D-Vol block is "0" in cases where the block data are read from the D-Vol block, because the encrypted block data "*" is stored in the D-Vol block, when the encrypted block data "*" is supplied to the client device 103, the client device 103 is unable to specify the corresponding erasure block data corresponding to the encrypted block data "*".

Figure 8:
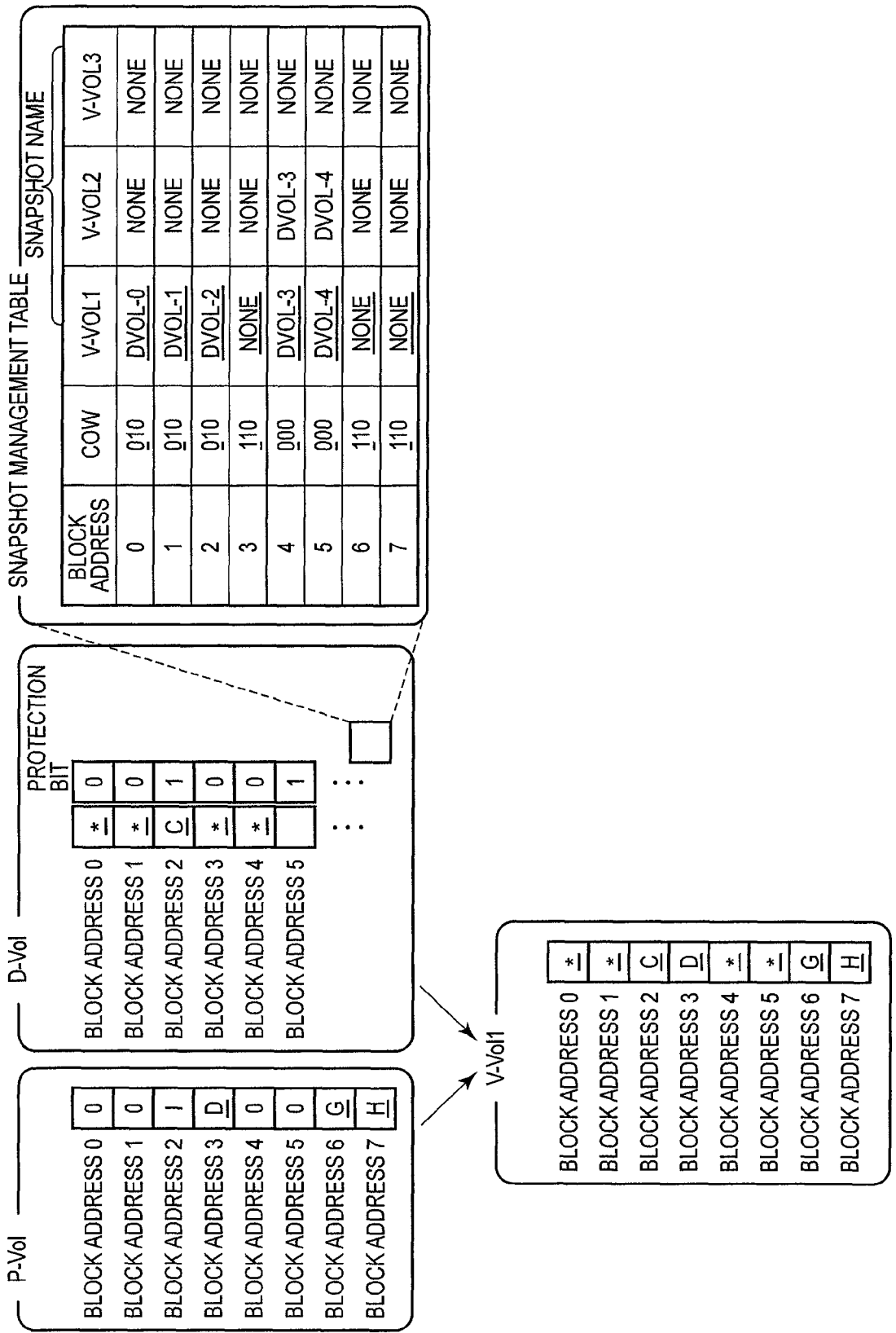
FIG. 8 shows the creation of a snapshot V-VOL1 corresponding to a first snapshot acquisition time point.

A specific example is shown in FIG. 8. That is, the read processing program 2072 judges whether to read block data from a P-Vol block or a D-Vol block on the basis of the respective COW bits corresponding to the respective V-VOL blocks constituting the V-VOL1 in cases where all of the block data in the V-VOL1 are requested by a higher-level program (the file system program 205 in this embodiment). According to this example, block data are read from the D-Vol blocks #0, #1, #2, #3, and #4 for the V-VOL blocks #0, #1, #2, #4, and #5 of V-VOL1 and block data are read from the corresponding P-Vol blocks #3, #6, and #7 for the remaining V-VOL blocks #3, #6, and #7 of the V-VOL1. Here, the encrypted block data "*" is read for the V-VOL blocks #0, #1, #4, and #5 (D-Vol blocks #0, #1, #3, and #4). Even when the encrypted block data "*" are sent back to the client device 103 via the higher-level program, the client device 103 is unable to know the corresponding erasure block data corresponding to the encrypted block data "*".

In cases where encrypted block data "*" are read from the D-Vol blocks corresponding to protection bit "0", the read processing program 2072 may send back an access error to the higher level program instead of the encrypted block data "*" being read and transmitted to the higher level program.

Further, as mentioned earlier, the encrypted block data "*" may be data which cannot be decoded to produce corresponding erasure block data or may be block data which can be decoded to produce corresponding erasure block data. The former case is called an 'irreversible protection case' and the latter case is known as a 'reversible protection case'. Specific examples of snapshot management for each case will be described hereinbelow.

<A: Irreversible Protection Case>

A method which involves substituting the corresponding erasure block data saved using COW with dummy block data (known as 'dummy data' hereinbelow) may be considered. The following (specific example A1) and (specific example A2) may be considered as specific examples of this method.

Specific Example A1

In the state shown in FIG. 4B, in cases where an erase write command to write erasure block data "0" to the P-Vol blocks #0 and #1 is received, the write processing program 2071 writes predetermined dummy data"-" in place of the corresponding erasure block data "A" and "B" to the D-Vol blocks #0 and #1 which constitute the saving destination of the corresponding erasure block data "A" and "B" which are stored in the P-Vol blocks #0 and #1, as shown in FIG. 9A. Further, the write processing program 2071 associates the addresses "DVOL-0" and "DVOL-1" of the D-Vol blocks #0 and #1 with the V-VOL block addresses 0 and 1. Thereafter, in response to the read request from the higher-level program, in cases where the V-VOL blocks #0 and #1 of the V-VOL1 are the read source, the read processing program 2072 detects the fact that the V-VOL blocks #0 and #1 correspond to the D-Vol blocks #0 and #1 corresponding to the protection bit "0" by referencing the snapshot management table. In this case, the read processing program 2072 may return the dummy data "-" which are stored in the D-Vol blocks #0 and #1 to the higher level program, and instead, may return an access error to the higher level program.

Specific Example A2

A predetermined storage area in which dummy data "-" are stored is provided beforehand. The predetermined storage area can be a storage area in the storage resource of either the NAS device 109 or the storage system 111. In this specific example, the predetermined storage area is a specified block in the D-Vol (conveniently called a 'dummy block' hereinbelow). In this specific example, in cases where an erase write command to write erasure block data "0" to the P-Vol blocks #0 and #1 is received, the write processing program 2071 does not execute writing of predetermined dummy data "-" to the D-Vol as shown in FIG. 9B unlike (Specific example A1). In this case, in this specific example, the write processing program 2071 associates the address "DVOL-FF" of a predetermined dummy block with the V-VOL block addresses 0 and 1. Thereafter, in response to the read request from the higher level program, in cases where the V-VOL blocks #0 and #1 of the V-VOL1 constitute the read source, the read processing program 2072 detects the association of the dummy block with V-VOL blocks #0 and #1 by referencing the snapshot management table. In this case, the read processing program 2072 may send back the dummy data "-" stored in the dummy block to the higher level program or may instead send back an access error to the higher level program. According to this specific example, because there is no increase in the dummy data "-" in the D-Vol, the storage capacity consumed by the D-Vol can be reduced.

In the irreversible protection case, instead of dummy data, the encrypted block data may be data which is obtained by encrypting the corresponding erasure block data using an irreversible conversion system such as a hash value or the like of the corresponding erasure block data.

<B: Reversible Protection Case>

A method of using a reversible conversion system to encrypt corresponding erasure block data which have been saved in COW may be considered. (Specific example B1) and (specific example B2) which follow may be considered.

Specific Example B1

Protection by Means of Encryption which Uses an Encryption Key

The corresponding erasure block data are encrypted using an encryption key with a specified encryption algorithm, whereby encrypted block data corresponding to the corresponding erasure block data are generated. Two kinds of cases may be considered for the timing with which encryption is performed, namely a case where encryption is performed when an erase write request is received and a case where encryption is executed with timing that differs from the timing with which an erase write request is received (that is, asynchronously and independently of the timing with which the erase write request is received). The same is also true for the substitution of the dummy data.

Specific Example B2

Protection by Means of Encryption which Uses a Bit Mask

Logical computation (XOR, for example) of the corresponding erasure block data which have been saved in the D-Vol which employs an optional bit pattern is performed and the data calculated by means of the logical computation are written to the D-Vol. In cases where the data are read target block data, logical computation of the data which employs the same bit pattern as the bit pattern used in the logical computation is performed, and as a result, the original corresponding erasure block data are restored.

The processing which is carried out in this embodiment will be described hereinbelow.

Figures 10A, 10B:
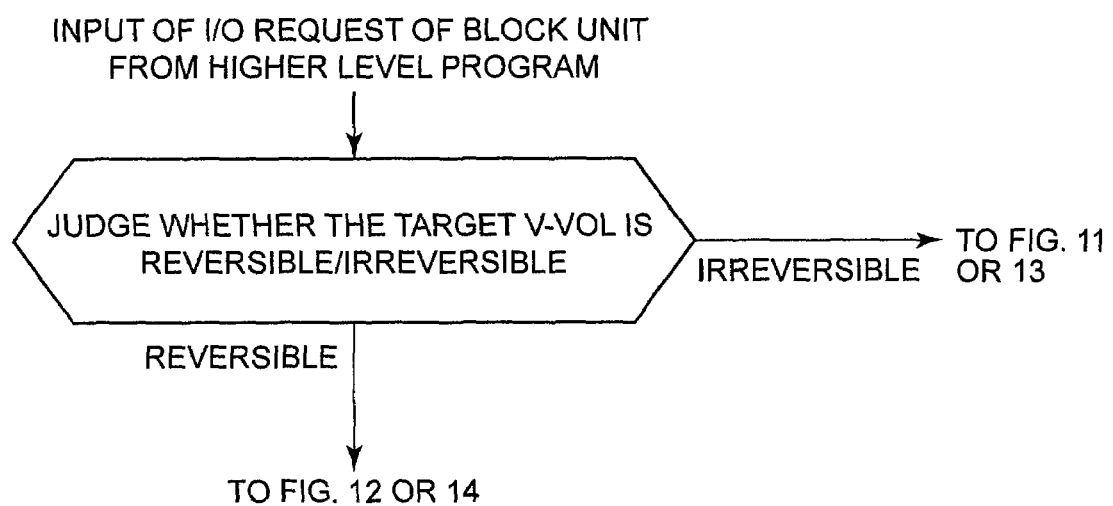
FIG. 10A shows a judgment which is performed by a snapshot program to which a block unit I/O request is input.
FIG. 10B shows a table which is referenced in the judgment shown in FIG. 10A.
Figure 11:
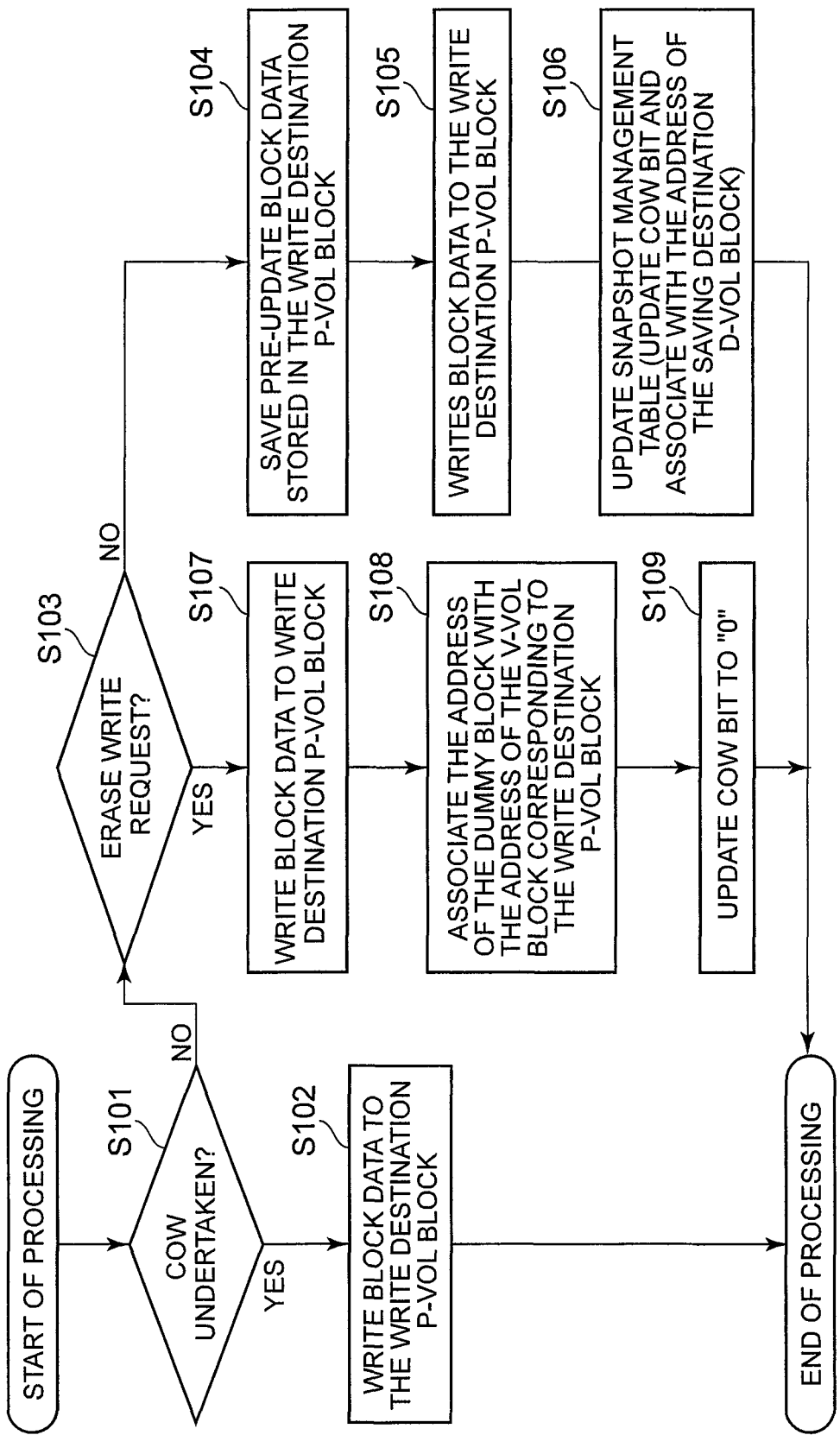
FIG. 11 is a flowchart of processing performed by the write processing program in an irreversible protection case.
Figure 12:
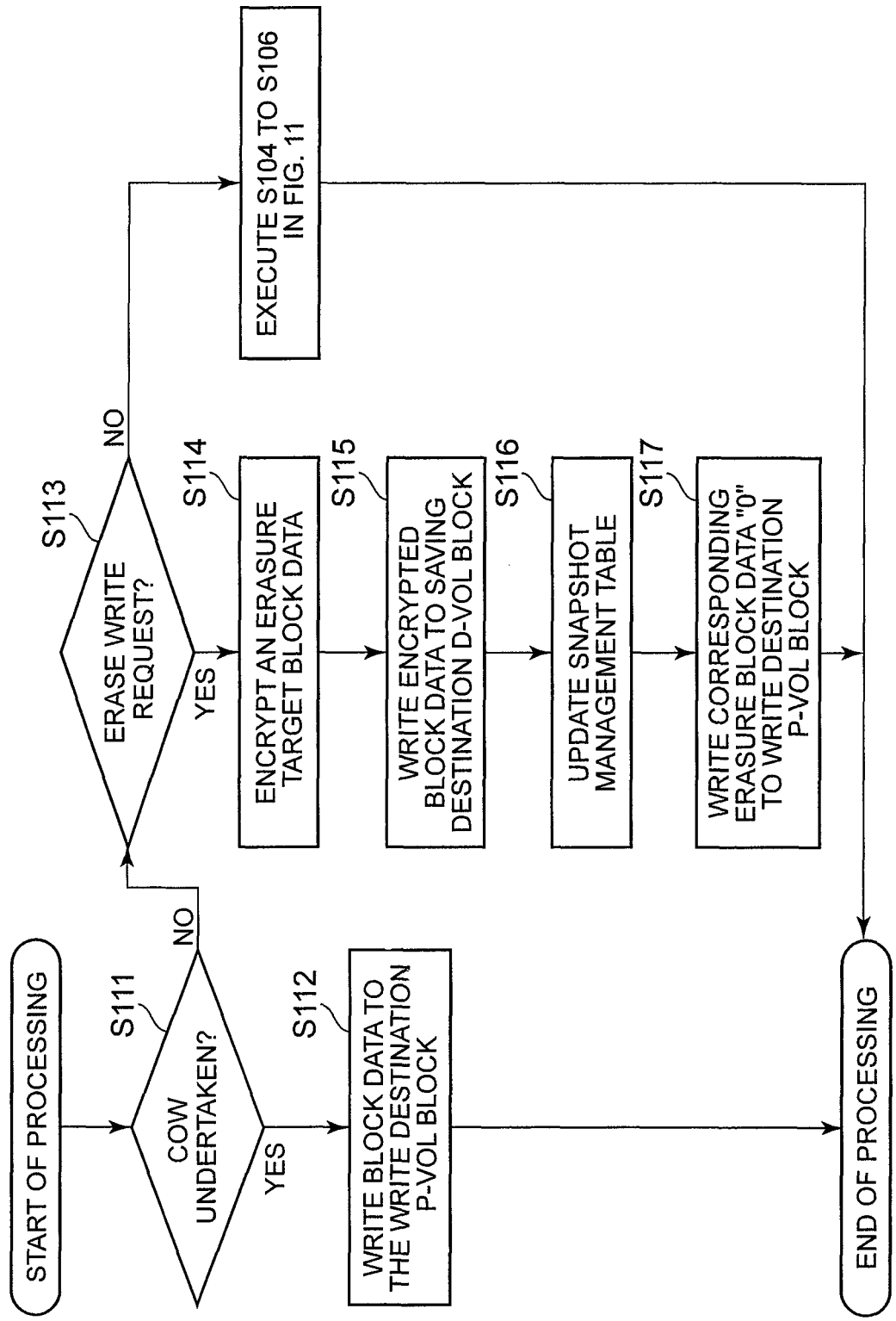
FIG. 12 is a flowchart of processing performed by the write processing program in a reversible protection case.
Figure 13:
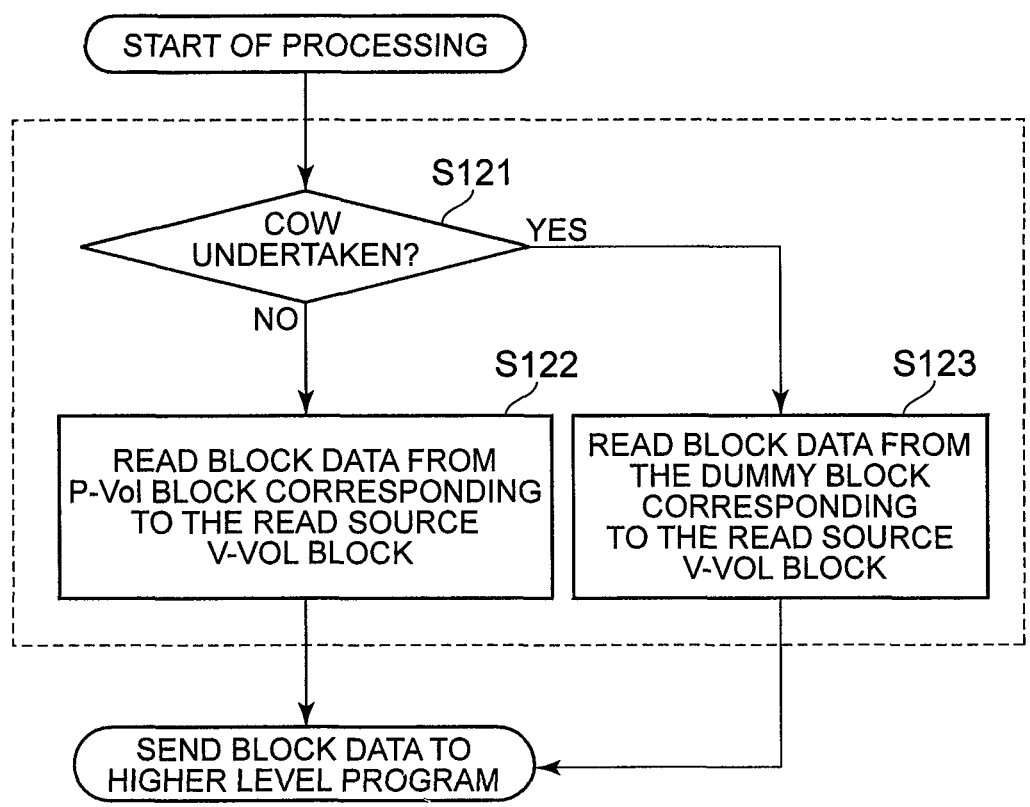
FIG. 13 is a flowchart of processing performed by a read processing program in an irreversible protection case.
Figure 14:
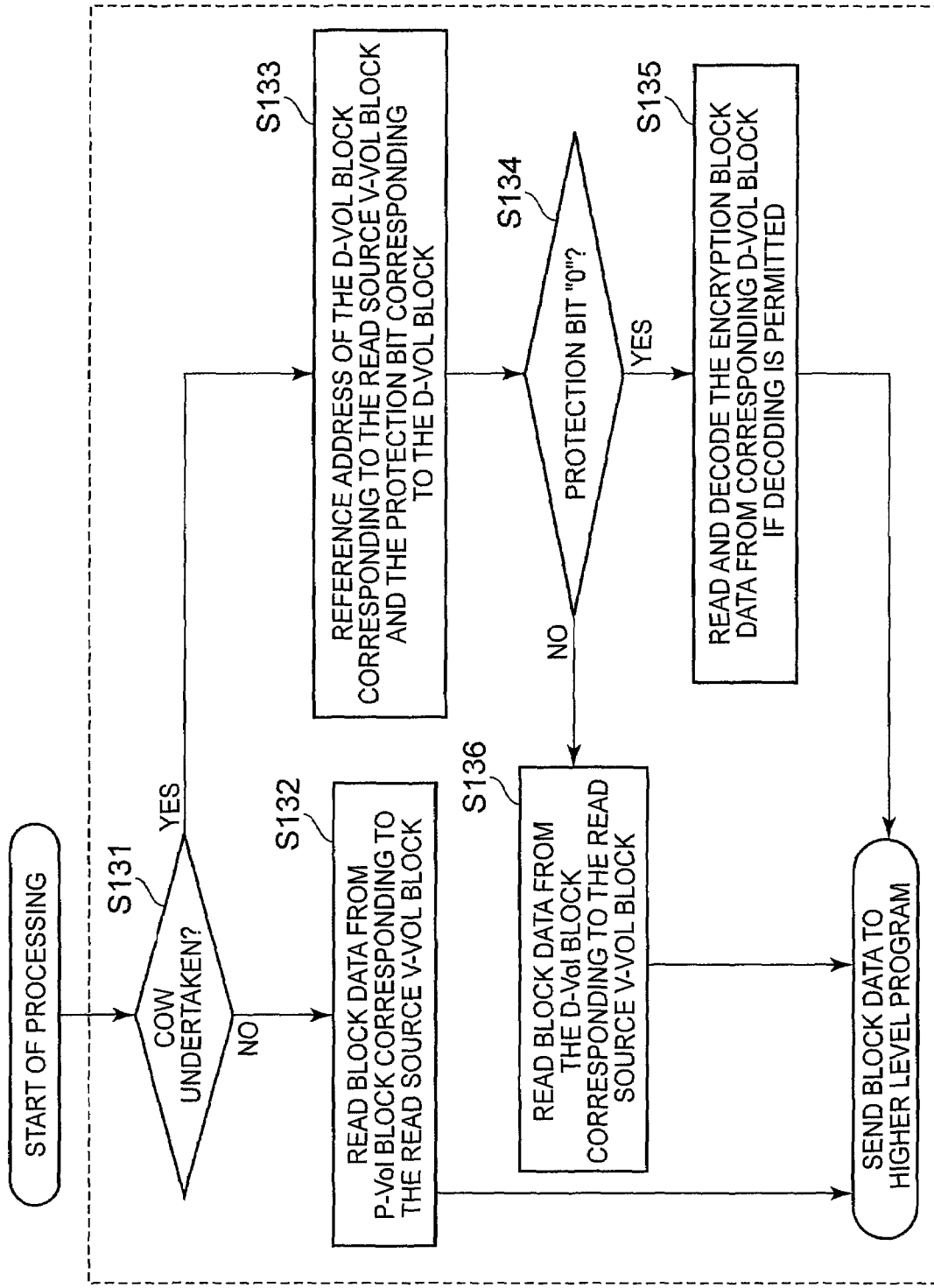
FIG. 14 is a flowchart of processing performed by the read processing program in a reversible protection case.

In cases where a block unit I/O request is input to the snapshot program 207, the judgment shown in FIG. 10A is executed. The judgment shown in FIG. 10A is performed by the write processing program 2071 if the I/O request thus input is a write request and is performed by the read processing program 2072 if the I/O request thus input is a read request. The judgment shown in FIG. 10A is a judgment of whether the target V-VOL is compatible with reversible protection or irreversible protection. This judgment is carried out on the basis of the table illustrated in FIG. 10B, for example. If the I/O request thus input is a write request and the target V-VOL is compatible with irreversible protection, the processing shown in FIG. 11 is carried out, and if the I/O request thus input is a write request and the target V-VOL is compatible with reversible protection, the processing shown in FIG. 12 is carried out. However, if the I/O request thus input is a read request and the target V-VOL is compatible with irreversible protection, the processing shown in FIG. 13 is carried out, and if the I/O request thus input is a read request and the target V-VOL is compatible with reversible protection, the processing shown in FIG. 14 is carried out. At this stage, the 'target V-VOL' is a V-VOL corresponding to the snapshot acquisition time point in cases where the I/O request thus input is a write request. For example, in cases where the input of the write request is between the first snapshot acquisition time point and the second snapshot acquisition time point, the 'target V-VOL' is V-VOL1. However, in cases where the I/O request thus input is a read request, the 'target V-VOL' is the V-VOL designated by the read request.

FIG. 11 is a flowchart of processing performed by the write processing program 2071 in an irreversible protection case. Of (Specific example A1) and (Specific example A2), the processing shown in FIG. 11 corresponds to the processing of (Specific example A2) (See FIG. 9B).

Suppose that a write request is input between the first snapshot acquisition time point and the second snapshot acquisition time point, for example.

The write processing program 2071 judges whether the write destination P-Vol block has undergone COW by referencing the COW bit corresponding to the write destination P-Vol block designated by the write request (the COW bit corresponding to the V-VOL1) (S101). If it is judged that the write destination P-Vol block has undergone COW (YES in S101), the write processing program 2071 writes block data corresponding to the write request to the write destination P-Vol block (S102).

If it is judged that the write destination P-Vol block has not undergone COW in S101 (NO in S101), the write processing program 2071 judges whether the write request from the higher level program (the file system program 205) is an erase write request or a normal write request (S103). If it is judged that the write request is a normal request (NO in S103), the write processing program 2071 executes COW in which the block data which have been stored in the write destination P-Vol block are saved in the D-Vol (S104) and writes block data corresponding to the write request to the write destination P-Vol (S105). The write processing program 2071 then updates the snapshot management table (S106). More specifically, the write processing program 2071 associates the address of the saving destination D-Vol block with the address of the V-VOL block corresponding to the write destination P-Vol block (block in V-VOL1) and updates the COW bit corresponding to the V-VOL block to "0" (subjected to COW).

If the write request is judged to be an erase write request in S103 (YES in S103), the write processing program 207 writes erasure block data to the write destination P-Vol block (S107). The write processing program 207 also associates a dummy block address with the address of the V-VOL block corresponding to the write destination P-Vol block (block in V-VOL1) in the snapshot management table (S108). Furthermore, the write processing program 2071 updates the COW bit corresponding to the write destination P-Vol block (the COW bit corresponding to the V-VOL1) to "0" (has undergone COW) (S106).

The completion of the writing is reported to the higher level program after S102, S106, and S109.

FIG. 12 is a flowchart of the processing which is performed by the write processing program 2071 in a reversible protection case.

The write request is input between the first snapshot acquisition time point and the second snapshot acquisition time point, for example.

The write processing program 2071 judges whether the write destination P-Vol block has undergone COW by referencing the COW bit corresponding to the write destination P-Vol block designated by the write request (the COW bit corresponding to the V-VOL1) (S111). If it is judged that the write destination P-Vol block has undergone COW (YES in S111), the write processing program 2071 writes block data corresponding to the write request to the write destination P-Vol block (S112).

If it is judged that the write destination P-Vol block has not undergone COW in S111 (NO in S111), the write processing program 2071 judges whether the write request from the higher level program (the file system program 205) is an erase write request or a normal write request (S113). If it is judged that the write request is a normal request (NO in S113), the write processing program 2071 executes S104 to S106 in FIG. 11.

If it is judged that the write request is an erase write request (YES in S113), the write processing program 2071 uses a reversible conversion system to encrypt the corresponding erasure data which are stored in the write destination P-Vol block (S114) and writes the encrypted data (encrypted block data) to the saving destination D-Vol block (S115). Further, the write processing program 2071 updates the snapshot management table (S116). More specifically, the write processing program 2071 associates the address of the saving destination D-Vol block with the address of the V-VOL block corresponding to the write destination P-Vol block (block in V-VOL1), updates the COW bit corresponding to the V-VOL block to "0" (which has undergone COW), and updates the protection bit corresponding to the saving destination D-Vol block to "0". The write processing program 2071 writes the erasure block data to the write destination P-Vol block (S117).

The completion of writing is reported to the higher level program following S102, S106, and S117.

FIG. 13 is a flowchart of the processing which is performed by a read processing program 2072 in an irreversible protection case. Of the (Specific example A1) and (Specific example A2), the processing shown in FIG. 13 corresponds to the processing of (Specific example A2) (see FIG. 9B).

Suppose that a V-VOL block in the V-VOL1 is designated, for example, by a read request.

The read processing program 2072 judges whether the read source V-VOL block has undergone COW by referencing the COW bit corresponding to the read source V-VOL block designated by the read request (the COW bit corresponding to V-VOL1) (S121). If it is judged that the read source V-VOL block has undergone COW (YES in S121), the read processing program 2072 reads block data from the P-Vol block corresponding to the read source V-VOL block (S122).

If it is judged in S121 that the read source V-VOL block has not undergone COW (NO in S121), the read processing program 2072 reads dummy data from a dummy block corresponding to the read source V-VOL block (the dummy block corresponding to the dummy block address specified by referencing the snapshot management table) (S123).

The read processing program 2072 transmits the data read in S122 or S123 to the higher level program. The data read in S123 are dummy data, and therefore, leakage of the corresponding erasure block data is prevented. Instead of executing S123, an access error may be sent back to the higher level program. Furthermore, the group of steps in the dotted line frame in FIG. 13 are executed for the respective V-VOL blocks designated by the read request.

FIG. 14 is a flowchart of the processing performed by the read processing program 2072 in a reversible protection case.

Suppose that the V-VOL block in the V-VOL1 is designated, for example, by a read request.

The read processing program 2072 judges whether the read source V-VOL block has undergone COW by referencing the COW bit corresponding to the read source V-VOL block designated by the read request (the COW bit corresponding to V-VOL1) (S131). If it is judged that the read source V-VOL block has undergone COW (YES in S131), the read processing program 2072 reads block data from the P-Vol block corresponding to the read source V-VOL block (S132).

If it is judged in S131 that the read source V-VOL block has not undergone COW (NO in S131), the read processing program 2072 references the address of the D-Vol block corresponding to the address of the read source V-VOL block and the protection bit corresponding to the D-Vol block (S133).

If the protection bit referenced in S133 is "1" (NO in S134), the read processing program 2072 reads block data from the D-Vol block corresponding to the read source V-VOL block (S136).

If the protection bit referenced in S133 is "0" (YES in S134), the read processing program 2072 reads encrypted block data from the D-Vol block corresponding to the read source V-VOL block, and if decoding is permitted, the read processing program 2072 decodes the encrypted block data (S135). If decoding is not permitted, the read processing program 2072 reads but does not decode the encrypted block data or sends back an access error to the higher level program. Whether or not decoding is permitted can be judged on the basis of the ID of the user of the client device 103 and the table in which it is recorded, for each user ID, whether decoding is permitted, for example.

The read processing program 2072 transmits the data which are read in S132 or S136 or the corresponding erasure data obtained as a result of the decoding in S135 (or the encrypted block data that have not been decoded) to the higher level program. The group of steps in the dotted line frame in FIG. 14 are executed for the respective V-VOL blocks designated by the read request.

The first embodiment of the present invention was described hereinabove.

Second Embodiment

The second embodiment of the present invention will be described hereinbelow. In so doing, the differences from the first embodiment will mainly be described and a description of the points in common with the first embodiment will be omitted or simplified.

In this embodiment, a scheme for improving the strength with which leakage of the corresponding erasure block data is prevented is implemented. More specifically, the D-Vol block address which is associated with the V-VOL block address in the snapshot management table is encrypted. The encrypted D-Vol block address is a D-Vol block address which is associated with a V-VOL (called the 'address encryption target V-VOL' hereinbelow) for which the number of D-Vol blocks is greater than a predetermined threshold value (called the 'protection block threshold value' hereinbelow) corresponding to protection bit "0" in the associated D-Vol block.

An encrypted D-Vol block address will be described with reference to FIGS. 15A and 15B. In this example, suppose that the protection block threshold value is three.

According to FIG. 15A, there are five D-Vol blocks which are associated with the V-VOL1 and, of these D-Vol blocks, there are four D-Vol blocks corresponding to protection bit "0". In contrast, there are two D-Vol blocks associated with V-VOL2 and, of these D-Vol blocks, there are also two D-Vol blocks corresponding to the protection bit "0".

Therefore, according to FIG. 15A, the address encryption target V-VOL is V-VOL1. This is because there are four D-Vol blocks corresponding to the protection bit "0", this being greater than 3 which is the protection block threshold value.

Hence, as shown in FIG. 15B, all of the D-Vol block addresses which exist in the V-VOL column corresponding to V-VOL1 are encrypted (in FIG. 15B, the encrypted D-Vol block address is shown as "***") In other words, not only is the D-Vol block address corresponding to the protection bit "0", the D-Vol block address corresponding to protection bit "1" is also encrypted. This is because, even when data that exist in the V-VOL in which there is a large number of D-Vol blocks corresponding to the protection bit "0" are block data which are not corresponding erasure block data, there is a high probability of high secrecy that has not leaked. However, the D-Vol block address corresponding to the protection bit "1" is not necessarily encrypted, only the D-Vol block address corresponding to the protection bit "0" may be encrypted.

FIG. 16 shows a constitutional example of the snapshot management table according to the second embodiment of the present invention. FIGS. 15A and 15B do not show the snapshot management table with the constitution shown in FIG. 16 due to space requirements on the page.

In the second embodiment, columns and rows which are shown within dot-chain line ellipses are added to the snapshot management table.

That is, an encryption column is added as a column. Three encryption bits corresponding to the V-VOL 1 to 3 exist in each of the V-VOL block addresses in the encryption column. The encryption bit "1" indicates the fact that the D-Vol block address which is associated with the V-VOL block address corresponding to the encryption bit "1" has not been encrypted. The encryption bit "0" indicates the fact that the D-Vol block address which is associated with the V-VOL block address corresponding to the encryption bit "0" has been encrypted.

An encryption necessity row and creation date and time row are added as rows. The encryption necessity row records a value which represents the necessity of encryption of each V-VOL. If the value is "Yes", this means that encryption is required, and if the value is "No", this indicates that encryption is not necessary. The creation date and time records the date and time of the snapshot acquisition time point for each V-VOL. For example, the date and time are written in the cell corresponding to the V-VOL1 in the creation date and time row as the snapshot acquisition time point corresponding to the V-VOL1 by the write processing program 2071 at the time point at which the first snapshot acquisition request is received.

The snapshot program 207 comprises an address encryption control program 2073 in addition to the write processing program 2071 and read processing program 2072. The address encryption control program 2073 controls which particular D-Vol block address (and dummy block address) which is associated with a particular V-VOL is encrypted.

Figure 17:
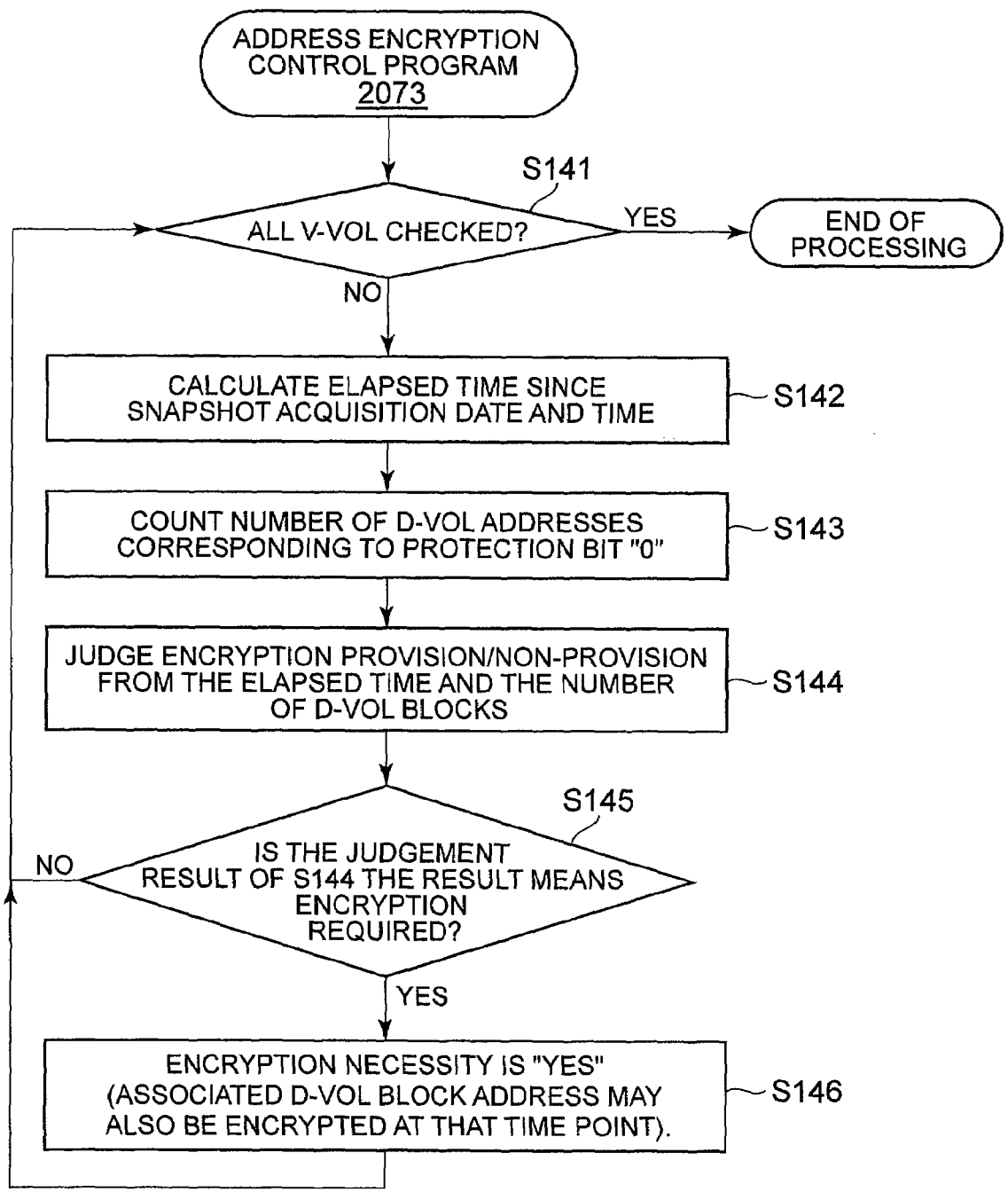
FIG. 17 is a flowchart of processing performed by an address encryption control program.

FIG. 17 is a flowchart of processing performed by the address encryption control program 2073.

The address encryption control program 2073 performs the processing of S142 and subsequent steps hereinbelow for all of the V-VOL1 to 3. The processing of S142 and subsequent steps will be described hereinbelow by taking the example of V-VOL1 of V-VOL1 to 3.

The address encryption control program 2073 specifies the date and time of the snapshot acquisition time point corresponding to the V-VOL1 from the snapshot management table and calculates the time elapsed from the specified date and time until the current date and time (S142).

Thereafter, the address encryption control program 2073 counts the number of D-Vol blocks corresponding to the protection bit "0" among the D-Vol blocks associated with the V-Vol1 (S143).

The address encryption control program 2073 then judges whether encryption of the D-Vol block address is required for the V-VOL1 on the basis of the elapsed time calculated in S142 and the number of D-Vol blocks counted in S143 (S144). Here, the time elapsed exceeds a predetermined length of time, for example, and in cases where the number thus counted exceeds the protection block threshold value, it is judged that encryption is required. The grounds for considering whether or not the elapsed time exceeds a predetermined length of time is so that the length of time over which the addresses of the blocks in which data which are possibly highly confidential exist remain unencrypted is kept within a fixed time.

In cases where encryption is judged as being required in the judgment of S144 (YES in S145), the address encryption control program 2073 sets the value "Yes" in the cell in the encryption necessity row corresponding to the V-VOL1 (S146). That is, the address encryption control program 2073 performs settings so that the V-VOL1 is the V-VOL of the address encryption target.

In S146, in addition to setting the encryption necessity as "Yes", the address encryption control program 2073 may also encrypt all of the D-Vol block addresses which already exist in the V-VOL column corresponding to the V-VOL1 (or the D-Vol block addresses corresponding to protection bit "0").

Figure 18:
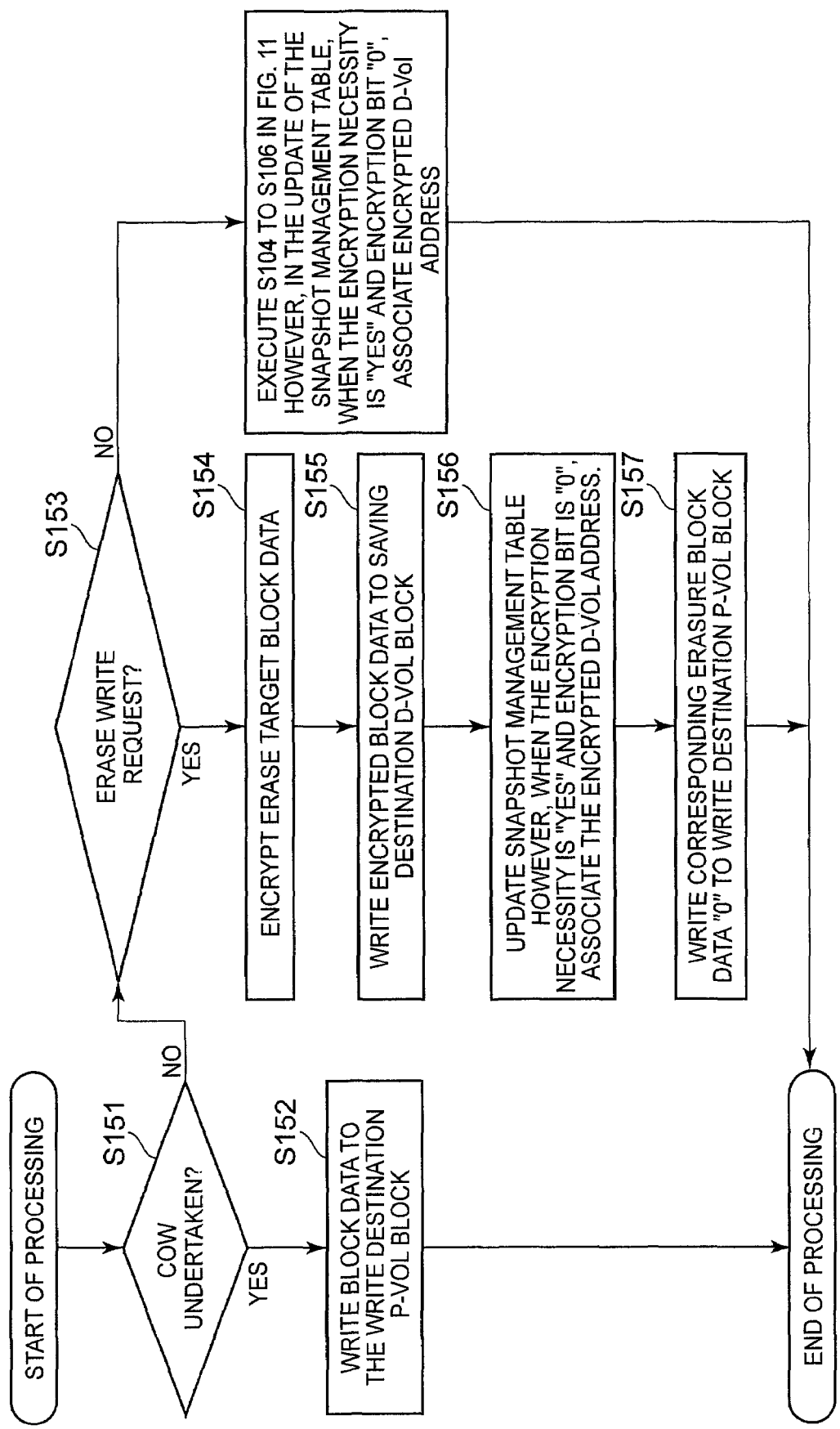
FIG. 18 is a flowchart of processing performed by the write processing program in a reversible protection case according to the second embodiment of the present invention.

FIG. 18 is a flowchart of the processing performed by the write processing program 2071 in a reversible protection case according to the second embodiment of the present invention.

A write request is input between the first snapshot acquisition time point and the second snapshot acquisition time point, for example.

The write processing program 2071 judges whether the write destination P-Vol block has undergone COW by referencing the COW bit corresponding to the write destination P-Vol block designated by the write request (the COW bit corresponding to V-VOL1) (S151). If it is judged that the write destination P-Vol block has undergone COW (YES in S151), the write processing program 2071 writes block data corresponding to the write request to the write destination P-Vol block (S152).

If it is judged that the write destination P-Vol block has not undergone COW in S151 (NO in S151), the write processing program 2071 judges whether the write request from the higher level program (the file system program 205) is an erase write request or a normal write request (S153). If it is judged that the write request is a normal write request (NO in S113), the write processing program 2071 executes S104 to S106 in FIG. 11. Thereupon, in the update of the snapshot management table, if the encryption necessity corresponding to V-VOL1 is "Yes" and the encryption bit corresponding to the V-VOL block address corresponding to the write destination P-Vol block is "1", the write processing program 2071 associates the encrypted saving destination D-Vol block address with the address of the V-VOL block corresponding to the write destination P-Vol block in the snapshot management table and updates the encryption bit corresponding to the V-VOL block address to "0".

If the write request is judged to be an erase write request in S153 (YES in S153), the write processing program 207 uses a reversible conversion system to encrypt the corresponding erasure data which are stored in the write destination P-Vol block (S154) and writes the encrypted data (encrypted block data) to the saving destination D-Vol block (S155). The write processing program 2071 then updates the snapshot management table (S116). More specifically, if the encryption necessity corresponding to the V-VOL1 is "Yes" and the encryption bit corresponding to the V-VOL block address corresponding to the write destination P-Vol block is "1", the write processing program 2071 associates the encrypted saving destination D-Vol block address with the address of the V-VOL block corresponding to the write destination P-Vol block and updates the encryption bit corresponding to the V-VOL block address to "0". Further, the write processing program 2071 updates the COW bit corresponding to the V-VOL block to "0" (which has undergone COW) and updates the protection bit corresponding to the saving destination D-Vol block to "0". The write processing program 2071 writes the erasure block data to the write destination P-Vol block (S157).

Figure 19:
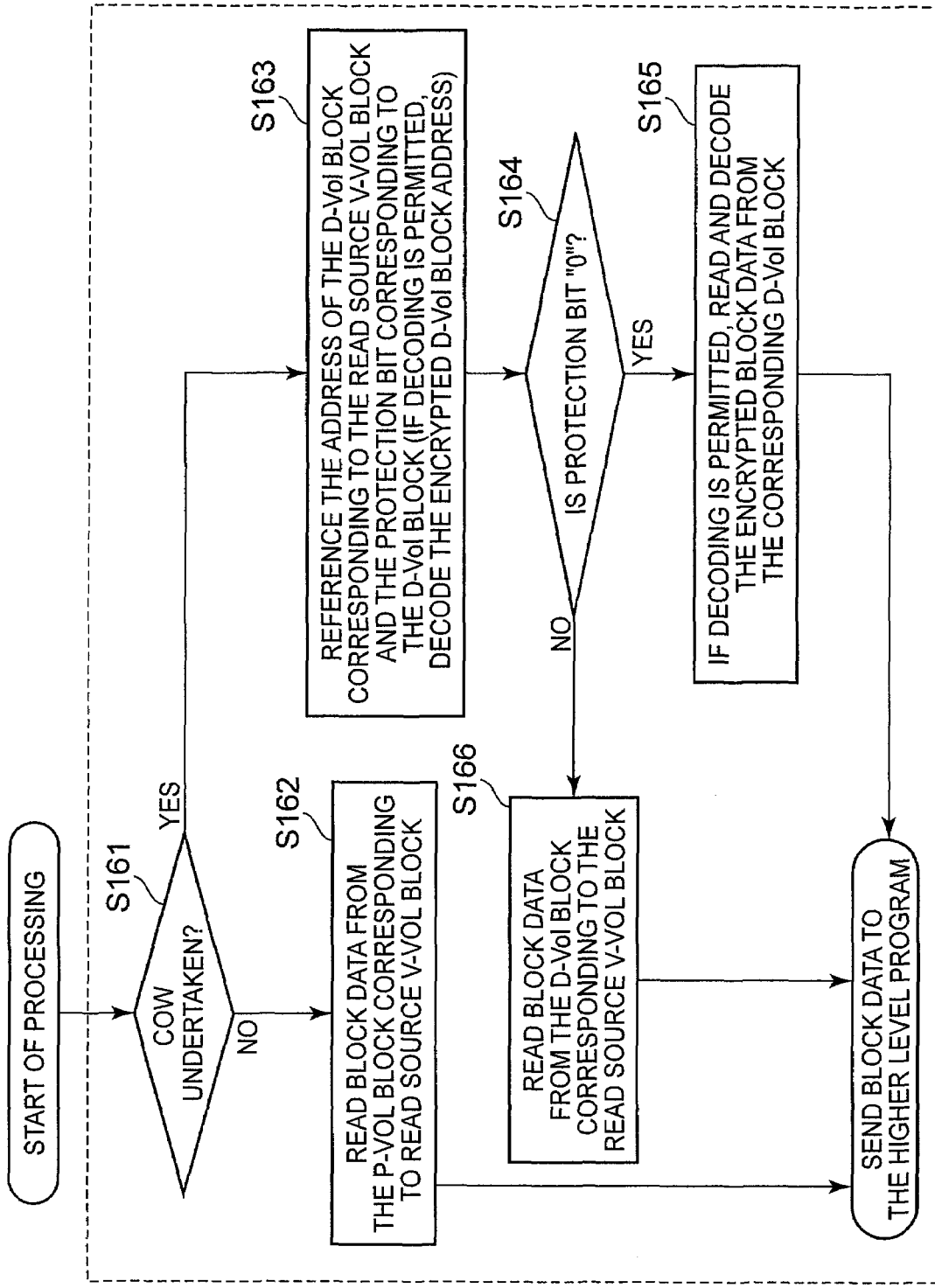
FIG. 19 is a flowchart of processing performed by the read processing program in a reversible protection case according to the second embodiment of the present invention.

FIG. 19 is a flowchart of the processing which is performed by the read processing program 2072 in a reversible protection case according to the second embodiment of the present invention.

The read request designates the V-VOL block of the V-VOL1, for example.

The read processing program 2072 judges whether the read source V-VOL block has undergone COW by referencing the COW bit corresponding to the read source V-VOL block designated by the read request (the COW bit corresponding to V-VOL1) (S161). If it is judged that the read source V-VOL block has undergone COW (YES in S161), the read processing program 2072 reads block data from the P-Vol block corresponding to the read source V-VOL block (S162).

If it is judged in S161 that the read source V-VOL block has not undergone COW (NO in S161), the read processing program 2072 references the address of the D-Vol block corresponding to the address of the read source V-VOL block and the protection bit corresponding to the D-Vol block (S163). Thereupon, in cases where address decoding is permitted (in cases where the setting corresponding to the user ID is "decoding permitted", for example) and if the encryption necessity corresponding to the V-VOL1 is "Yes" and the encryption bit corresponding to the read source V-VOL block is "0", the read processing program 2072 decodes the D-Vol block address thus encrypted and references the decoded D-Vol block address.

The read processing program 2072 reads block data from the D-Vol block corresponding to the read source V-VOL block if the protection bit reference in S163 is "1" (NO in S164) (S166).

If the protection bit referenced in S163 is "0" (YES in S164), the read processing program 2072 reads the encrypted block data the encrypted block data from the D-Vol block corresponding to the read source V-VOL block, and if decoding is permitted, decodes the encrypted block data (S165).

A few preferred embodiments of the present invention were described hereinabove. However, these are examples serving to illustrate the present invention, there being no intention to limit the scope of the present invention to these embodiments alone. The present invention can also be implemented in a variety of forms.

For example, the encryption of the corresponding erasure block data may also be performed by storage system 111 instead of by NAS device 109. More specifically, for example, the CPU 3071 of the storage system 111 monitors the protection bit corresponding to the saving destination D-Vol block, and in cases where it is detected that the protection bit has been updated to "0", the CPU 3071 of the storage system 111 may also encrypt the block data which are stored in the saving destination D-Vol block corresponding to the updated protection bit "0" using a reversible conversion format or an irreversible conversion format.

The NAS device 109 and the storage system 111 may also be integrated, for example. More specifically, for example, the NAS device 109 may be incorporated in the storage system 111 as an interface circuit board for the client device 103.

What is claimed is:

1. A storage control device which provides a higher level device with a first logical volume among first and second logical volumes of a storage device and manages a snapshot of the first logical volume, comprising:
   a write processing module which, in cases where data elements corresponding to a write target are written to a first storage area in the first logical volume at or after a snapshot acquisition time point, saves pre-update data elements which are stored in the first storage area in the second logical volume, and writes data elements corresponding to the write target to the first storage area; and
   a read processing module which, in cases where data elements are read from a second storage area of the snapshot of the first logical volume, reads data elements from the storage area in the second logical volume if a storage area in the second logical volume is associated with the second storage area and reads data elements from the storage area in the first logical volume corresponding to the second storage area if a storage area in the second logical volume is not associated with the second storage area,
   wherein in cases where the write processing module receives a write request corresponding to erasure, and in response to the write request corresponding to erasure, overwrites erasure-corresponding data elements which are data elements corresponding to an erasure target and which are stored in a third storage area in the first logical volume with erasure data elements which are data elements signifying erasure at or after the snapshot acquisition time point, the write processing module associates the third storage area with a fourth storage area in which dummy data corresponding to the erasure-corresponding data elements stored in the third storage area are stored, wherein when receiving a command requesting to erase a data element, old data, which is copied to a different volume during Copy On Write snapshot, is set to be unable to be read and in Copy On Write snapshot, when overwriting, although old data is copied, the old data is substituted with dummy data, and wherein the dummy data is stored one region having a plurality of regions are linked.

2. The storage control device according to claim 1, wherein the read processing module receives a first read request and in cases where, in response to the first read request, the read processing module reads data elements from a fifth storage area of the snapshot of the first logical volume, if the fifth storage area corresponds to the fourth storage area, the read processing module executes any of the following (1) to (3):

(1) transmitting the dummy data stored in the fourth storage area to a transmission source of the first read request;

(2) transmitting the erasure-corresponding data elements obtained by decoding the dummy data to the transmission source of the first read request; and (3) transmitting an access error to the transmission source of the first read request.

3. The storage control device according to claim 1, wherein the fourth storage area is a storage area in the second logical volume;

whether protection is required or not is set for each storage area of the second logical volume;

the write processing module sets such that protection is required for the fourth storage area which constitutes a write destination of the dummy data of the corresponding erasure data stored in the third storage area; and the dummy data stored in the fourth storage area are data elements which are obtained by encrypting the erasure-corresponding data elements stored in the third storage area using a reversible conversion format.

4. The storage control device according to claim 3, wherein the read processing module executes the following (1) and (2):

(1) in cases where data elements are read from the fifth storage area of the snapshot of the first logical volume in response to the first read request, if detecting that a setting is made such that protection is required for the fourth storage area, and if decoding is permitted, reading the dummy data from the fourth storage area and decoding same, and transmitting the erasure-corresponding data elements obtained by the processing to the transmission source of the first read request; and (2) in cases where a second read request is received and data elements are read from a sixth storage area of the snapshot of the first logical volume in response to the second read request, if detecting that a setting is made such that protection is not required for a seventh storage area in the second logical volume corresponding to the sixth storage area, reading data elements from the seventh storage area and transmitting the data elements to the transmission source of the second read request without decoding the data elements.

5. The storage control device according to claim 1, wherein the dummy data are data elements which cannot be decoded to produce the erasure-corresponding data elements.

6. The storage control device according to claim 5, wherein the dummy data are specified data elements different from the erasure-corresponding data elements;

the fourth storage area is a predetermined storage area in which the specified data elements are stored in advance and is a storage area common to a plurality of storage areas in the first logical volume in which a plurality of the corresponding erasure data are stored; and the write processing module associates the fourth storage area with the storage area of the write destination of the erasure data elements irrespective of which storage area in the first logical volume the erasure data elements are written to.

7. The storage control device according to claim 1, further comprising:

an address encryption module which if, among a plurality of storage areas which constitute the snapshot of the first logical volume, the number of storage areas associated with the storage area in which dummy data are stored is greater than a first number, encrypts respective storage area addresses in snapshot management information that comprises the respective storage area addresses associated with addresses of the respective storage areas constituting the snapshot of the first logical volume.

8. The storage control device according to claim 7, wherein the snapshot management information comprises the address of the storage area in the second logical volume corresponding to the address of the storage area of the snapshot of the first logical volume for each generation of the snapshot of the first logical volume; and the address which is associated with the address of the storage area of a snapshot of a generation for which the number of storage areas in which dummy data are stored is greater than the first value is encrypted.

9. The storage control device according to claim 1, further comprising:

an encryption setting module which if, among a plurality of storage areas which constitute the snapshot of the first logical volume, the number of storage areas associated with the storage area in which dummy data are stored is greater than a first number, sets the snapshot as an encryption target, wherein in cases where the write processing module detects that the snapshot has been set as the encryption target, the write processing module associates an encrypted address of a saving destination storage area in the second logical volume with the address of the storage area of the snapshot of the first logical volume corresponding to the first storage area in snapshot management information which comprises the storage area address which is associated with the address of the storage area constituting the snapshot of the first logical volume.

10. The storage control device according to claim 1, wherein the write processing module treats the dummy data of the erasure-corresponding data elements as either data elements which are obtained by using a reversible conversion format to encrypt the corresponding erasure data, or data elements in a format which does not permit decoding to produce the corresponding erasure data, depending on which snapshot acquisition time point the time point at which the erasure data elements are written follows.

11. The storage control device according to claim 1, wherein the write processing module and read processing module are contained in the snapshot management module which manages the snapshot of the first logical volume;
- a higher level processing module which converts a file unit I/O request received from the higher level device into a block unit I/O request and outputs the block unit I/O request to a lower level is provided on a level above the snapshot management module;
- the write target and the erasure target are files;
- the data elements are block data;
- the write processing module writes data elements corresponding to the write target file in response to a block unit write request;
- the read processing module reads data elements corresponding to a read target file and transmits the data elements thus read to the higher level processing module which is a transmission source of the block unit read request, in response to a block unit read request;
- when receiving an erasure request designating an erasure target file from the higher level device, the higher level processing module associates a write request to overwrite the erasure-corresponding data elements corresponding to the erasure target file with the erasure data elements, with an erasure declaration and sends the result to the snapshot management module; and
- a write request corresponding to the erasure is the write request associated with the erasure declaration.

12. A storage system which provides a higher level device with a first logical volume among first and second logical volumes and manages a snapshot of the first logical volume, comprising:
- a plurality of physical storage devices which form the basis of the first and second logical volumes;
- a write processing module which, in cases where data elements corresponding to a write target are written to a first storage area in the first logical volume at or after a snapshot acquisition time point, saves pre-update data elements stored in the first storage area in the second logical volume, and writes data elements corresponding to the write target to the first storage area; and
- a read processing module which, in cases where data elements are read from a second storage area of the snapshot of the first logical volume, reads data elements from the storage area in the second logical volume if a storage area in the second logical volume is associated with the second storage area and reads data elements from the storage area in the first logical volume corresponding to the second storage area if a storage area in the second logical volume is not associated with the second storage area,
- wherein in cases where the write processing module receives a write request corresponding to erasure, and in response to the write request corresponding to erasure, overwrites erasure-corresponding data elements which are data elements corresponding to an erasure target and which are stored in a third storage area in the first logical volume, with erasure data elements which are data elements signifying erasure at or after the snapshot acquisition time point, the write processing module associates the third storage area with a fourth storage area in which dummy data corresponding to the erasure-corresponding data elements stored in the third storage area are stored,
- wherein when receiving a command requesting to erase a data element, old data, which is copied to a different volume during Copy On Write snapshot, is set to be unable to be read and in Copy On Write snapshot, when overwriting, although old data is copied, the old data is substituted with dummy data, and
- wherein the dummy data is stored one region having a plurality of regions are linked.

13. A snapshot management method which executes the following steps (A) and (B):
(A) in cases where data elements corresponding to a write target are written to a first storage area in a first logical volume provided for a higher level device at or after a snapshot acquisition time point, saving pre-update data elements which are stored in the first storage area in a second logical volume that is not provided for the higher level device and writing data elements corresponding to the write target to the first storage area; and
(B) in cases where data elements are read from a second storage area of a snapshot of the first logical volume, reading data elements from the storage area in the second logical volume if a storage area in the second logical volume is associated with the second storage area, and reading data elements from a storage area in the first logical volume corresponding to the second storage area if a storage area in the second logical volume is not associated with the second storage area, the snapshot management method comprising the steps of:
receiving an erasure declaration-related write request; and
in cases where, in response to the erasure declaration-related write request, erasure-corresponding data elements which are data elements corresponding to an erasure target and which are stored in a third storage area in the first logical volume are overwritten with erasure data elements which are data elements signifying erasure at or after the snapshot acquisition time point, associating the third storage area with a fourth storage area in which dummy data corresponding to the erasure-corresponding data elements stored in the third storage area are stored,
wherein when receiving a command requesting to erase a data element, old data, which is copied to a different volume during Copy On Write snapshot, is set to be unable to be read and in Copy On Write snapshot, when overwriting, although old data is copied, the old data is substituted with dummy data, and
wherein the dummy data is stored one region having a plurality of regions are linked.

* * * * *